US006569059B1

(12) United States Patent
Ito

(10) Patent No.: US 6,569,059 B1
(45) Date of Patent: May 27, 2003

(54) CONTROL APPARATUS FOR VEHICLE PROVIDED WITH POWER SOURCE AND CONTINUOUSLY VARIABLE TRANSMISSION AND CONTROL METHOD THEREFOR

(75) Inventor: Yasushi Ito, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/503,493

(22) Filed: Feb. 14, 2000

(30) Foreign Application Priority Data

Feb. 12, 1999 (JP) .......................................... 11-033613

(51) Int. Cl.⁷ ............................................... B60K 41/04
(52) U.S. Cl. ....................................... 477/110; 477/107
(58) Field of Search ............................. 477/37, 43, 44, 477/47, 107, 110, 118

(56) References Cited

U.S. PATENT DOCUMENTS

| | | | | |
|---|---|---|---|---|
| 4,911,275 A | * | 3/1990 | Ohkumo et al. | ............ 477/47 X |
| 5,050,455 A | * | 9/1991 | Yamashita et al. | ......... 477/43 X |
| 5,079,969 A | * | 1/1992 | Kato et al. | ..................... 74/858 |
| 5,199,399 A | * | 4/1993 | Shibuya | ..................... 477/47 X |
| 5,239,894 A | * | 8/1993 | Oikawa et al. | ................ 74/857 |
| 5,484,351 A | * | 1/1996 | Zhang et al. | ........... 477/110 X |
| 5,612,873 A | * | 3/1997 | Ogawa | ...................... 477/43 X |
| 5,672,138 A | * | 9/1997 | Mikami et al. | .......... 477/110 X |
| 5,685,800 A | * | 11/1997 | Toukura | ................. 477/107 X |
| 5,776,028 A | * | 7/1998 | Matsuda et al. | ........... 477/44 X |
| 5,967,940 A | * | 10/1999 | Yamaguchi | ................ 477/97 X |
| 6,009,365 A | * | 12/1999 | Takahara et al. | ......... 477/118 X |
| 6,063,003 A | * | 5/2000 | Kubota et al. | ................. 477/43 |
| 6,174,261 B1 | * | 1/2001 | Watanabe et al. | ............. 477/43 |

FOREIGN PATENT DOCUMENTS

| | | | |
|---|---|---|---|
| EP | 0 289 396 | 11/1988 | |
| EP | 0530281 | 3/1993 | |
| EP | 11-5460 | 1/1999 | |
| EP | 11-20512 | 1/1999 | |
| JP | 3-70637 | 3/1991 | |
| JP | 6-109120 | * 4/1994 | .................. 477/47 |
| JP | 07293649 A | 11/1995 | |
| JP | 10-38067 | 2/1996 | |
| JP | 08177997 A | 7/1996 | |
| JP | 8-177694 | 7/1998 | |
| JP | 11005460 A | 1/1999 | |
| WO | WO 92/17348 | 10/1992 | |

* cited by examiner

Primary Examiner—Saul Rodriquez
Assistant Examiner—Roger Pang
(74) Attorney, Agent, or Firm—Oblon, Spivak, McClelland, Maier & Neustadt, P.C.

(57) ABSTRACT

A preventive ECU of a control unit for a vehicle provided with a power source and a continuously variable transmission controls an ECU for controlling an engine and an ECU for controlling a CVT to perform control of output torque of the engine, control of gear change of the CVT and control of a period for backlash preventive control. When the relationship of the portion including the engine and the CVT and a portion including wheels (the vehicle) is alternately changed from a driven state and a driving state, backlash which is present in the drive system and which causes vibrations in the longitudinal direction is canceled before acceleration control of the vehicle and control of backing or transient surge are performed. The control unit for a vehicle is able to sufficiently reduce vibrations of the vehicle in the longitudinal direction and prevent discomfort for a person in the vehicle by canceling the backlash of the drive system.

10 Claims, 17 Drawing Sheets

US 6,569,059 B1

CONTROL APPARATUS FOR VEHICLE PROVIDED WITH POWER SOURCE AND CONTINUOUSLY VARIABLE TRANSMISSION AND CONTROL METHOD THEREFOR

INCORPORATION BY REFERENCE

The disclosure of Japanese Patent Application No. HEI 10-33613 filed on Feb. 12, 1999 including the specification, drawings, and abstract is incorporated herein by reference in its entirety.

BACKGROUND OF THE INVENTION

1. Field of the Invention

The present invention relates to a control apparatus for a vehicle provided with a power source and a continuously variable transmission which is capable of continuously varying the gear ratio, and more particularly to a control apparatus and a control method, each of which is capable of canceling backlash which is present in a drive system and which causes vibrations in the longitudinal direction of the vehicle (backing or transient surge and shock) to be produced.

2. Description of the Related Art

It is known that when the gear ratio of a continuously variable transmission of a vehicle provided with the continuously variable transmission is raised to meet a requirement for accelerating the vehicle or a requirement for increasing output by demand made through depression of an accelerator pedal or the like, vibrations are produced in the longitudinal direction of the vehicle at a moment of completion of the gear change. The foregoing occurrence is called "backing or transient surge" which is caused by inertia torque or the elasticity of a power transmission system. That is, when the gear ratio of the continuously variable transmission is raised to meet the requirement for increasing the output from the power source such as an engine, or the requirement for accelerating the vehicle, the number of revolutions of a rotor of the transmission of power is changed. Therefore, inertia torque corresponding to the variation of the number of the revolutions (the angular acceleration) and the inertia moment is generated. When the number of revolutions of the rotor is stabilized to a required number of revolutions after the gear shift has been completed, the inertia torque is relieved. As a result, the inertia torque temporarily increases the drive torque, causing longitudinal vibrations to be generated owing to the deflection elasticity of the power transmission system.

An apparatus for preventing longitudinal vibrations of the vehicle of the foregoing type has been disclosed in Japanese Patent Laid-Open No. HEI 8-177997. The disclosed apparatus is designed to control the gear ratio to prevent vibrations in the longitudinal direction of the vehicle. That is, the moment at which the gear shift completes is obtained in accordance with a target gear ratio and a present gear ratio. Moreover, the half period of the vibrations of the vehicle in the longitudinal direction which are expected to be generated upon completion of gear shift is predicted in accordance with input torque corresponding to the gear ratio and an actual gear ratio. Thus, the gear ratio is forcibly corrected to a gear ratio by which the vehicle speed is raised at the time of a half period of the vibrations of the vehicle in the longitudinal direction before the moment at which the gear shift is completed. When the foregoing control is performed, about half of the inertia torque is relieved at the time of the half period before the moment at which the gear shift is completed. Therefore, the peak of the vibrations substantially coincides with the moment at which the gear shift is completed. When the torque caused from the vibrations is afterwards reduced, the residual inertia torque is relieved. As a result, the inertia torque acts to prevent vibrations. This control will be hereinafter referred to as a backing or transient surge preventive control.

The backing or transient surge preventive control realized by the apparatus disclosed in Japanese Patent Laid-Open No. HEI 8-177997 is structured such that the gear ratio is controlled only when the gear shift is completed. Therefore, there is apprehension that vibrations of the vehicle in the longitudinal direction occurring when the acceleration is started cannot completely be controlled. An apparatus proposed by the applicant of the present invention in Japanese Patent Application No. HEI 10-119772 is capable of effectively preventing vibrations of the vehicle in the longitudinal direction when both the output of the power source and the gear ratio of the continuously variable transmission are changed. According to the foregoing disclosure, the apparatus is provided with means which is structured such that when the output torque of the power source is controlled to correspond to the inertia torque generated owing to change in the gear ratio, the output torque of the power source is controlled to torque corresponding to the inertia torque and the target torque determined in accordance with the requirement for changing the drive force. The foregoing apparatus is able to effectively control the vibrations of the vehicle in the longitudinal direction caused from change in the drive force even when the gear shift is started following the request for a change of power source output.

Each of the foregoing apparatuses provides theoretical control realized with an ideal model having a drive system provided with a power source and a continuously variable transmission and is free from backlash and the like. Note that an actual vehicle includes a multiplicity of non-linear elements (for example, looseness caused by the backlash of the gear portions of the drive system and the spline portions). When the drive state is changed from a driven state in which the power source such as the engine is driven by the wheels connected to the continuously variable transmission to a driving state in which the output of the power source is transmitted to the wheels to drive the wheels, the backlash of the drive system exerts a great influence. That is, the kinetic energy accumulated during the motion as backlash is impulsively transmitted when the state of driving is changed. Moreover, output transmission timing of the power source is deviated. As a result, there arises a problem in that a structure constituted by adapting the foregoing control to an actual vehicle encounters generation of impact at an unintended time, and a deviation of the timing of the prevention control. Hence it follows that the vibrations of the vehicle in the longitudinal direction cannot satisfactorily be prevented. Thus, there arises a problem in that a person riding in the vehicle feels discomfort.

SUMMARY OF THE INVENTION

In view of the foregoing, an object of the present invention is to provide a control apparatus for a vehicle provided with a power source and a continuously variable transmission which is capable of quickly and adequately canceling backlash when the relationship between a power source and wheels connected to the continuously variable transmission is alternately changed between a driven state and a driving state in a case of a vehicle having the backlash in the drive system, and sufficiently reducing vibrations of the vehicle in the longitudinal direction owing to cancellation of the backlash so as to prevent any uncomfortable feeling for a person in the vehicle.

To achieve the foregoing object, according to a first aspect of the present invention, there is provided a control apparatus for a vehicle provided with a power source and a continuously variable transmission, comprising a backlash preventive control unit structured such that when a driving state and a driven state between the power source and the continuously variable transmission and wheels connected to the power source and continuously variable transmission through a drive system are alternately changed, the backlash preventive control unit cancels backlash present in the drive system so as to prevent vibrations of the vehicle caused from the backlash.

The backlash of the drive system is backlash which is present in a gear portion and a spline portion which transmit driving force. Note that the amount of each backlash was previously determined when the drive system was designed. The expression "cancellation of backlash" means to reduce the gaps of the tooth flanks of the gear portions and spline portions caused from the backlash in a direction in which the drive force is transmitted. Thus, the contact is realized when the power source and the continuously variable transmission is changed from the driven state to the driving state with respect to the wheels. Thus, impulsive collision of the tooth flanks is prevented.

The foregoing structure is arranged such that the backlash is canceled in advance when the driven state and the driving state are switched. Therefore, impact which occurs when the switching takes place can be prevented. As a result, vibrations of the vehicle in the longitudinal direction can sufficiently be reduced. As a result, discomfort for a person in the vehicle can be prevented. When control of backing or transient surge is implemented after the backlash has been canceled, more effective control of the backing or transient surge can be performed.

The backlash preventive control unit may be structured such that output of the power source during the preventive control or the output of the power source and period in which the output is controlled are determined in accordance with factors which exert an influence on the friction of the power source so as to cancel the backlash.

The factors which exert an influence on the friction of the power source include the number of revolutions of the power source, the water temperature, the oil temperature and whether or not an auxiliary device (for example, an air conditioner, an alternator, head lights, a power steering unit or a generator of a hybrid car) is being operated.

With the foregoing structure, torque for maintaining the number of revolutions of the power source required to adequately cancel the backlash in a state of actual drive of the vehicle or a control time required to adequately cancel the backlash can be obtained. As a result, smooth control for preventing backlash can be performed. Since the backlash is prevented, vibration of the vehicle in the longitudinal direction can sufficiently be reduced. Thus, discomfort for a person in the vehicle is prevented.

The backlash preventive control unit may be structured such that output of the power source during the preventive control or the output of the power source and period in which the output is controlled are determined in accordance with the gear ratio of the continuously variable transmission and the vehicle speed so as to cancel the backlash.

The shock and backing or transient surge caused from the backlash can easily be sensed by a person in the vehicle as the gear ratio is high or as the vehicle speed is low. Therefore, control for preventing backlash is performed slowly such that the output of the power source is reduced and a control period is made longer in a case where the gear ratio is high or in a case where the vehicle speed is low. As a result, the degree at which the backing or transient surge and the shock is sensed by a person in the vehicle can be lowered. When the gear ratio is low or the vehicle speed is high, the output of the power source for preventing the backlash is increased and the control period is shortened. As a result, the control for preventing the backlash can be quickly performed. Thus, shift to subsequent control of acceleration or the control for preventing backing or transient surge can be quickly performed. As a result, discomfort for a person in the vehicle can be prevented while control in which priority is given to the response is being performed.

The backlash preventive control unit may perform a short-period control in which prevention of the backlash is completed in a short time when the power source and the continuously variable transmission are changed from a driven state to a driving state and a long-period control in which prevention of the backlash is completed in time longer than the short-period control which is implemented when the driving state is changed to the driven state.

As a result of the foregoing structure, when the power source and the continuously variable transmission are changed from the driven state to the driving state, that is, when acceleration of the vehicle is required, the control for preventing the backlash is performed in a short time. In this case, the degree of vibrations in the longitudinal direction sensed by a driver can be lowered. Moreover, control can be performed in which any delay in the next operation is not sensed and priority is given to responsiveness. When the power source and the continuously variable transmission are changed from the driving state to the driven state, that is, deceleration of the vehicle speed is required, the control for preventing the backlash is performed for a long time. In this case, the control for canceling the backlash is performed slowly. Thus, the degree of vibrations of the vehicle in the longitudinal direction sensed by the driver can furthermore be lowered. As a result, control can be performed in which priority is given to the riding comfort of the vehicle.

The backlash preventive control unit may be structured to determine the switch between the driven state and the driving state in response to a signal supplied from an idle switch so as to cancel the backlash.

The foregoing structure enables the backlash preventive control unit to detect a direction in which the power source and the continuously variable transmission are switched between the driving state and the driven state in accordance with whether the idle switch is switched on or switched off. Therefore, control of preventing backlash adaptable to a state of driving of the vehicle can be performed with a simple structure.

The backlash preventive control unit may be structured to determine the switch between the driven state and the driving state in accordance with the relationship between predicted friction torque of the power source and torque of the power source shown in a graph so as to cancel the backlash.

The predicted friction torque is torque calculated in accordance with the number of revolutions of the power source, the water temperature, the oil temperature and whether or not the auxiliary device is being operated. The torque shown in the graph is torque obtained from an indicator graph of a combustion chamber of the power source and realized through actual combustion.

According to the foregoing structure, when the predicted friction torque is larger than the indicator torque, the power source and the continuously variable transmission are in the driven state. When the predicted friction torque is smaller than the indicator torque, the power source and the continuously variable transmission are in the driving state. The backlash preventive control unit compares the two types of torque with each other to accurately and quickly recognize switch between the driving state and the driven state so as to perform adequate control for preventing the backlash.

The backlash preventive control unit may be structured to recognize completion of the period in which the prevention is controlled in accordance with change in the vehicle speed so as to complete cancellation of the backlash.

Since the quantity of the backlash is known when the drive system was designed, the control period and completion of the control period can be selected from a plurality of adequate values predetermined in accordance with the output of the power source and the vehicle speed. According to the above-mentioned structure, the change in the vehicle speed or the like occurs at the instant when the backlash has been canceled in the direction in which the power of the drive system is transmitted. Thus, completion of the preventive control can easily be predicted. As a result, the overall structure of the control can be simplified.

The backlash preventive control unit may be structured such that when the power source and the continuously variable transmission are changed from the driven state to the driving state, the gear ratio of the continuously variable transmission is changed to the speed increase side before the output of the power source is increased to cancel the backlash of the drive system. Then, the output of the power source may be increased and the gear ratio of the continuously variable transmission is changed to the speed decrease side.

According to this structure, effective backlash control for directly canceling the backlash may be performed by temporarily changing the gear ratio of the continuously variable transmission to the speed increase side and temporarily decreasing the speed of the CVT.

The backlash preventive control unit may be structured such that when the power source and the continuously variable transmission are changed from the driven state to the driving state, at least one of the output of the power source and the gear ratio is controlled to make a rise in the number of revolutions of the power source to relatively be higher than a rise of the number of revolutions of the wheels so as to cancel the backlash.

Since the foregoing structure is arranged such that the rotations of the wheels are gradually brought closer to those of the power source, the backlash can be directly and smoothly canceled. As a result, control of the backlash can be performed more effective.

According to a second aspect of the present invention, there is provided a method of controlling a vehicle provided with a power source and a continuously variable transmission which is capable of continuously varying the gear ratio, the method comprising the steps of detecting a switch between a driving state and a driven state between a power source and a continuously variable transmission on one hand and wheels connected through a drive system on the other hand; and canceling backlash present in the drive system when the driving state and the driven state are alternately changed between the power source and the continuously variable transmission on one hand and the wheels on the other hand so as to prevent vibrations of the vehicle caused from the backlash.

According to the foregoing control method, the backlash can be canceled in advance when the switched is performed between the driven state and the driving state. Therefore, impact which is produced when the switch occurs can be eliminated. As a result, vibrations of the vehicle in the longitudinal direction can sufficiently be reduced. Hence it follows that discomfort for a person in the vehicle can be prevented.

DETAILED DESCRIPTION OF THE PREFERRED EMBODIMENTS

Preferred embodiments (hereinafter referred to as "embodiments") of the present invention will now be described with reference to the drawings.

Figure 1:
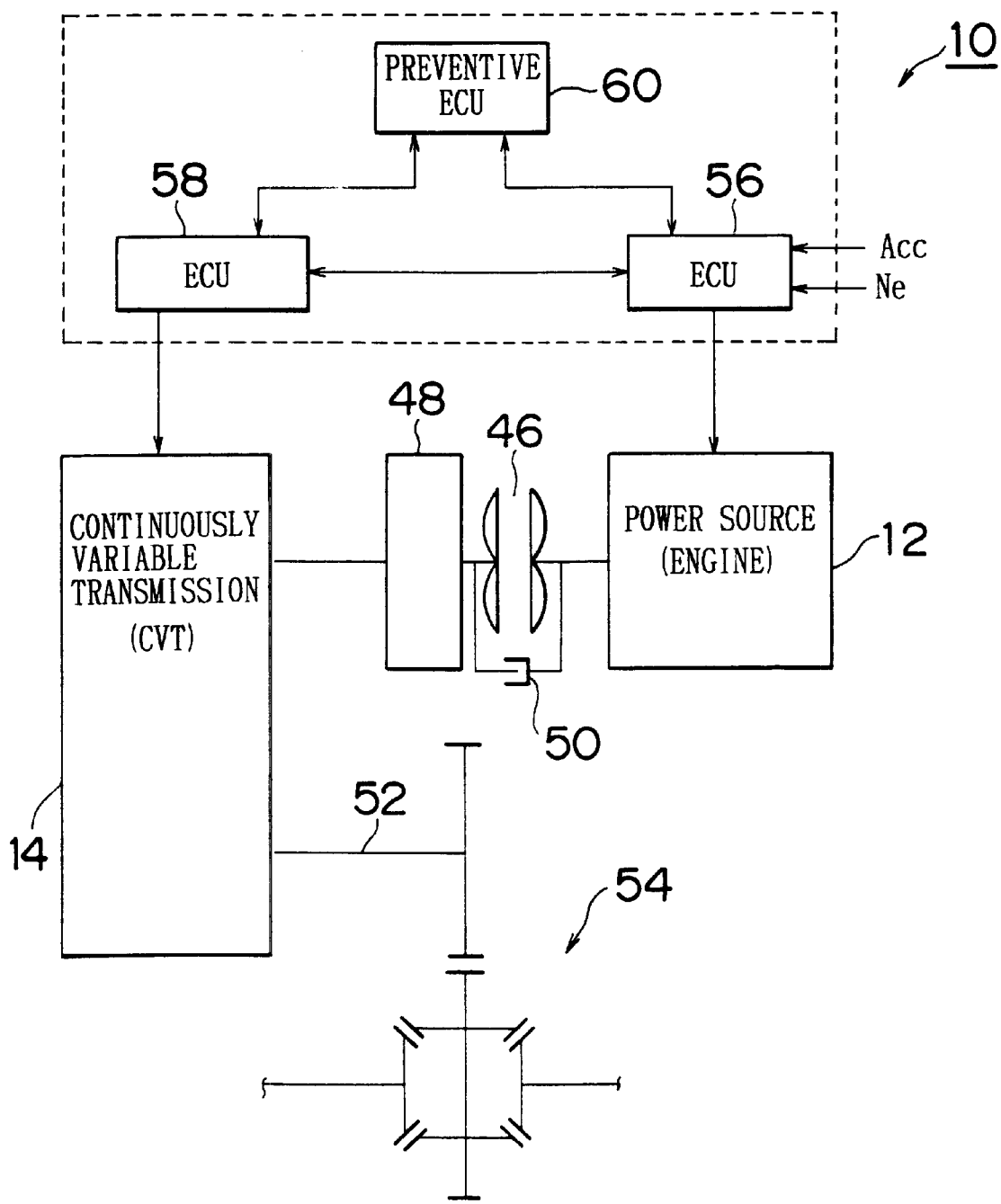
FIG. 1 is a block diagram showing the schematic structure a control unit for a vehicle according to an embodiment of the present invention.

FIG. 1 is a schematic view showing the structure of a control unit 10 of a vehicle provided with a power source and a continuously variable transmission according to an embodiment of the present invention. In this embodiment, a subject vehicle is a vehicle wherein a CVT 14 is connected to an output side of a power source 12. The power source 12 may be an internal combustion engine, such as a gasoline engine or a diesel engine, an electric motor or a hybrid engine of an electric motor and an internal combustion engine. The power source (hereinafter simply referred to as an "engine") 12 must be structured such that the output thereof can arbitrarily be controlled without a necessity of a manual operation. Specifically, the engine is an engine provided with an electronic-control throttle valve or an engine of a type for directly injecting fuel into cylinders.

The continuously variable transmission (hereinafter referred to as a "CVT") 14 is a transmission which is capable of continuously varying the gear ratio. The CVT 14 may be a belt-type CVT structured such that the widths of grooves of the driving pulley and the driven pulley are changed with hydraulic pressure to change the radii of the belts wound around the pulleys so that the gear change is performed. As an alternative to this, the CVT 14 may be a troidal-type CVT provided with a power roller sandwiched between a pair of discs each having a troidal surface so that the power roller is inclined to change the radius of the contact point between the disc so as to change the gear. The belt-type CVT is structured such that the groove width of each pulley is changed while a constant tension applied to the belt is maintained to change the gear ratio. The rate of change of the groove width becomes the shift speed. Therefore, when the hydraulic pressure which is applied/discharged to and from an actuator for driving a movable sheave (in the form of a rotor or a conical plate) of each pulley is controlled, the gear change speed can arbitrarily be controlled.

Figure 2:
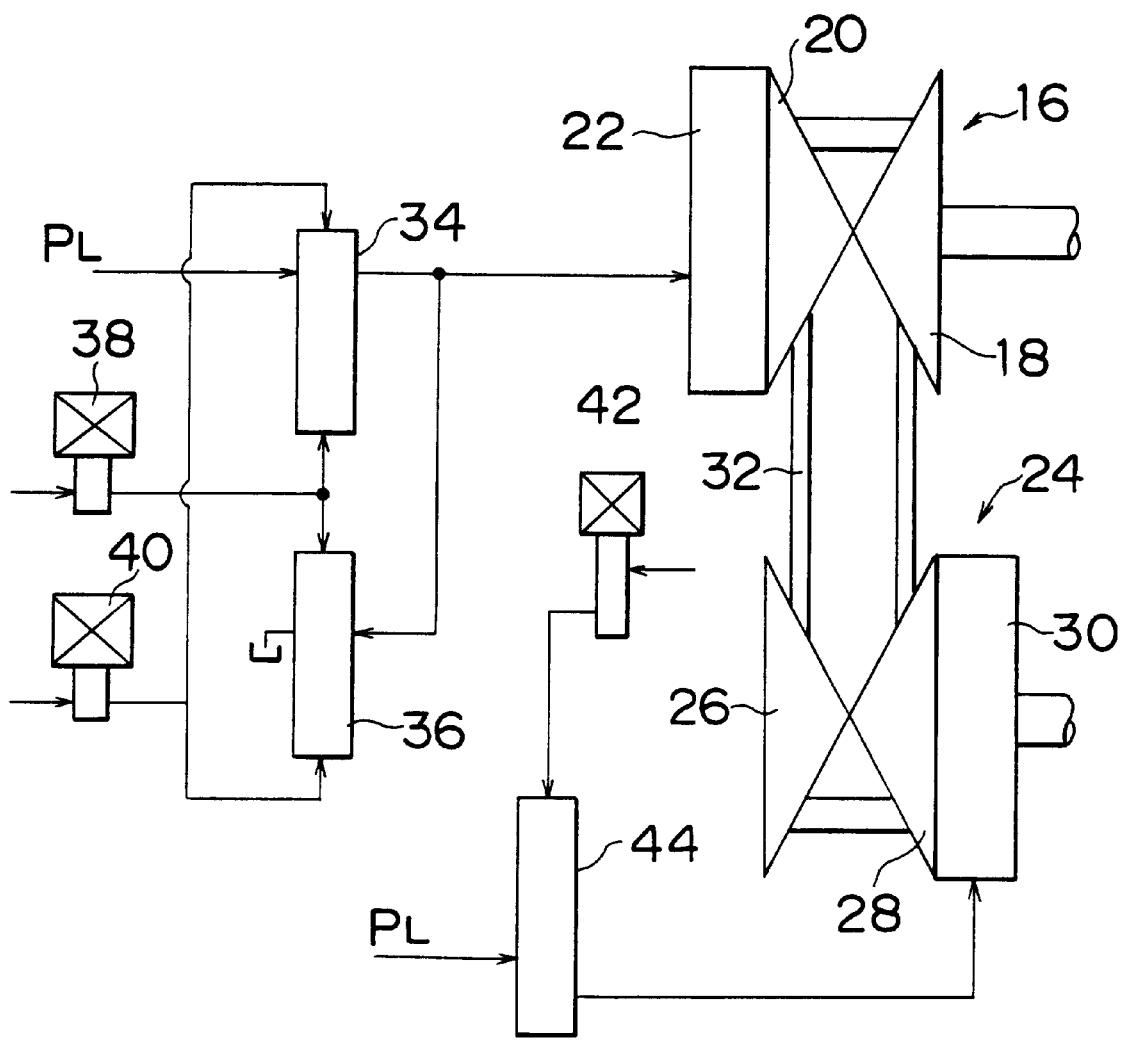
FIG. 2 is a diagram showing an example of a hydraulic circuit for a CVT adaptable to the control unit for a vehicle according to the embodiment of the present invention.

An example of the hydraulic circuit for realizing the foregoing hydraulic control is shown in FIG. 2. A drive pulley (a primary pulley) 16 is constructed such that a hydraulic actuator 22 causes a movable sheave 20 to approach/move away to and from a fixed sheave 18 so that the width of its groove is changed. Also a driven pulley (a secondary pulley) 24 disposed in parallel with the drive pulley 16 is constructed such that a hydraulic actuator 30 causes a movable sheave 28 to approach/move away to and from a fixed sheave 26 so that the width of the groove is changed. A belt 32 is wound around the drive pulley 16 and the driven pulley 24. To always maintain the centers of the drive pulley 16 and the driven pulley 24 at constant positions, the axial-directional positions of the fixed sheaves 18 and 26 and the movable sheaves 20 and 28 of the drive pulley 16 and the driven pulley 24 are made to be opposite to one another.

A speed increase valve 34 and a speed decrease valve 36 are connected to the hydraulic actuator 22 of the drive pulley 16. The speed increase valve 34 is spool-type valve. An output pressure of a first solenoid valve 38 which is duty-controlled and an output pressure of a second solenoid valve 40 which is ON/OFF-controlled are supplied to the two ends of the speed increase valve 34 in opposition to each other. Line pressure PL controlled according to the degree of opening of an accelerator or that of a throttle is supplied to an input port. Therefore, the speed increase valve 34 is structured to supply to the hydraulic actuator 22 the hydraulic pressure corresponding to a signal pressure output from the first solenoid valve 38.

The speed decrease valve 36 is a spool-type valve having two ends to which a signal pressure output from the first solenoid valve 38 and a signal pressure output from the second solenoid valve 40 are supplied in opposition to each other. The input port of the speed decrease valve 36 is connected to the hydraulic actuator 22 so that the input port of the speed decrease valve 36, that is, the hydraulic actuator 22, is communicated with a drain in accordance with a state whether the second solenoid valve 40 is turned on or turned off.

A pressure-control valve 44, the pressure level of which is controlled in accordance with the signal pressure of a linear solenoid valve 42, is connected to the hydraulic actuator 30 of the driven pulley 24. The pressure-control valve 44 uses the line pressure PL as the original pressure to control the pressure in accordance with the signal pressure of the linear solenoid valve 42. To always maintain a predetermined load with which the fixed sheave 26 and the movable sheave 28 of the driven pulley 24 sandwich the belt 32, that is, to maintain a tension of the belt 32, the pressure-control valve 44 controls the hydraulic pressure of the hydraulic actuator 30.

Therefore, the foregoing hydraulic circuit is structured such that the hydraulic actuator 22 on the drive side is cut off from the drain by the speed decrease valve 36 and the output pressure of the speed increase valve 34 is raised in that state, shifting the movable sheave 20 toward the fixed sheave 18. Thus, the width of the groove of the drive pulley 16 is decreased. As a result, the tension applied to the belt 32 is increased. Since the hydraulic pressure of the hydraulic actuator 30 on the driven side is maintained at a constant level, the width of the groove of the driven pulley 24 is enlarged. That is, the radius of the belt which is wound around the drive pulley 16 is enlarged. On the other hand the radius of the belt 32 which is wound along the driven pulley 24 is reduced. As a result, the gear ratio is lowered.

If the hydraulic actuator 22 on the drive side is communicated with the drain by the speed decrease valve 36, the tension of the belt 32 moves the movable sheave 20 rearwards. Thus, the width of the groove of the drive pulley 16 is enlarged. Simultaneously, the width of the groove of the driven pulley 24 is reduced. Therefore, the radius of the belt 32 which is wound around the drive pulley 16 is reduced and the radius of the belt 32 wound around the driven pulley 24 is enlarged. As a result, the gear ratio is increased.

Referring to FIG. 1, a transmission mechanism 46 and a longitudinal-direction-movement switch mechanism 48 are disposed between the engine 12 and the CVT 14. Basically, the transmission mechanism 46 is structured to intermittently rotate the engine 12 even when the vehicle is in a stopped state. The transmission mechanism 46 may be, for example, a torque converter provided with a lock-up clutch 50. As an alternative to this, a known mechanism, such as an electromagnetic clutch, a fluid coupling, a powder clutch or a dry clutch, may be employed. The longitudinal-direction-movement switch mechanism 48 is provided because the rotation of the engine 12 is limited to the two directions and the CVT 14 is not provided with a reverse movement mechanism. The longitudinal-directional-movement switch mechanism 48 may be constituted by a mechanism comprising a planetary gear mechanism or a mechanism having a reverse gear and a synchronous connecting mechanism.

A differential 54 is connected to the output shaft 52 of the CVT 14 through a gear. Therefore, backlash is mainly present in the foregoing gear and the differential 54.

Electronic control units (ECU) 56 and 58 for controlling the engine 12 and the CVT 14 are provided. Each of the ECU 56 and 58 comprises a microcomputer. The ECU 56 for the engine 12 stores input degree Acc of opening of the accelerator and number Ne of revolutions of the engine. The ECU 56 and 58 are connected to each other such that mutual data communication is permitted. The ECU's 56 and 58 control the output of the engine 12 and the gear ratio and the gear change speed of the CVT 14 in accordance with input data and programs stored in advance.

The backlash present in the gear and the differential 54 is a gap for smoothly engaging the tooth flanks of the gear portion and the spline portion. When the relationship between the engine 12 and the CVT 14 which are disposed on one side of the gear and the differential 54 and the wheels (the vehicle) which are disposed on another side is changed such that the driving side and the driven side are changed and thus the direction in which power is transmitted is changed, the backlash temporarily prevents the power transmission. Then, power is impulsively transmitted so that acceleration/deceleration shock occurs. The foregoing shock causes vibrations of the vehicle to be produced in the longitudinal direction. Moreover, backing or transient surge control for preventing the vibrations in the longitudinal direction is undesirably prevented. In each of the following embodiments, a backlash preventive control method is disclosed with which the backlash is canceled before the usual torque increase/decrease control for controlling the vehicle speed and the backing or transient surge preventive control for preventing the backing or transient surge are performed.

The following backlash preventive control is performed such that the preventive ECU 60 controls the ECU 56 for the engine and the ECU 58 for the CVT in a case shown in FIG. 1. The function of the preventive ECU 60 may be included in the ECU 56 or the ECU 58. As an alternative to this, the foregoing control units may be realized by one ECU.

First Embodiment

The characteristic of the first embodiment will now be described. When the state of power transmission between the engine 12 and the CVT 14 on one hand and the wheels (the vehicle) on the other hand are switched between the driving state and the driven state, the backlash present in the differential 54 or the like which is a portion of the drive system is canceled. When the cancellation is performed, the output of the engine 12, or at least one of the output of the engine 12 and the control period of the output of the engine 12, is determined in accordance with a factor which exerts an influence on the friction of the engine (the power source).

Actual means for canceling the backlash will now be described. When the state is changed from the driven state in which the engine 12 and the CVT 14 are supplied with power from the wheel side (the vehicle) to the driving state in which the engine 12 and the CVT 14 transmit power to the wheel side (the vehicle), the engine 12 and the CVT 14 must rotate faster than the wheel(the vehicle) side. Therefore, the engine 12 must generate torque required to maintain such rotation. In a case of an actual vehicle, the load of the engine 12 is changed owing to the number of revolutions of the engine, the water temperature of the engine, the oil temperature of the engine and the like. The load of the engine 12 also changes owing to whether or not an auxiliary device (for example, an air conditioner, an alternator, head lamps and the power steering unit and a generator in a case of a hybrid car) is being operated. Therefore, the torque and a period in which the torque is generated and which are required for the engine 12 to cancel the backlash of a predetermined quantity vary depending on a state of driving of the vehicle. To perform an adequate operation for canceling the backlash, the magnitude of the generated torque and the period in which the torque is generated, that is, the backlash preventive control variable, must appropriately be selected in accordance with the state of the vehicle. Note that the amount of the backlash present in the drive system of the vehicle is determined when the drive system is designed.

Figure 3:
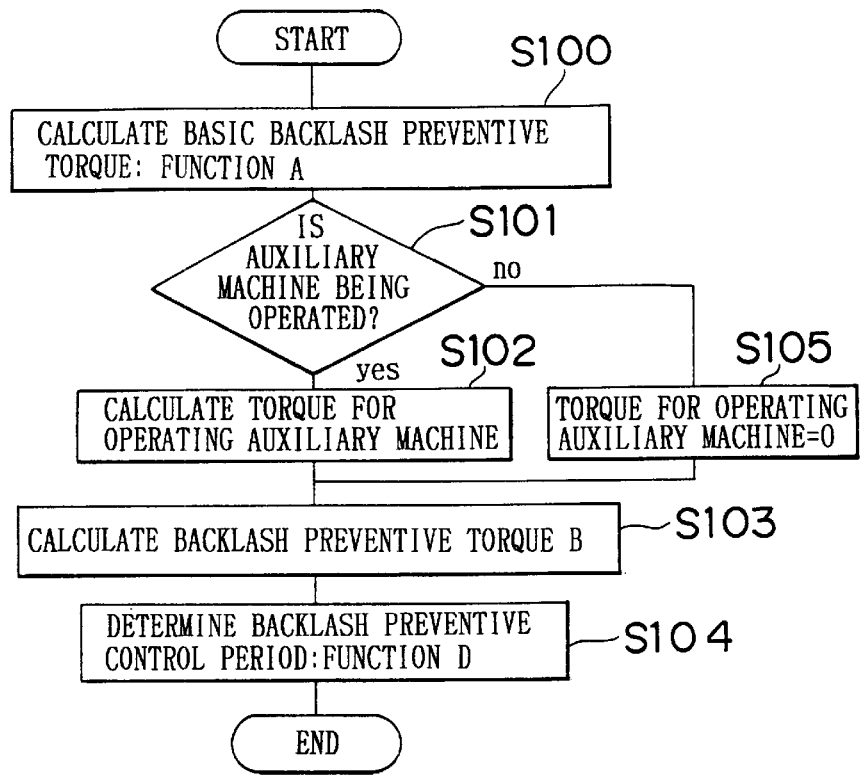
FIG. 3 is a flow chart for determining a backlash preventive control variable for use in a first embodiment of the present invention.

FIG. 3 shows a flow chart for obtaining the backlash preventive control variable for canceling the backlash present in the drive system, specifically, backlash preventive torque and a backlash preventive control period. The following control process is performed by the preventive ECU 60, and the ECU's 56 and 58 shown in FIG. 1 to operate the engine 12 and the CVT 14.

To cancel the backlash, the tooth flanks creating the backlash, that is, the tooth flanks of the driven gear (a spline) and a drive-side tooth surface which is in contact with the foregoing tooth flank must be separated from each other. Moreover, the opposite surfaces of the gears must be brought into contact with each other. Therefore, the preventive ECU 60, through the ECU 56, calculates a basic backlash preventive torque with which the backlash can be canceled in accordance with engine friction realized in a state in which the engine 12 is in a non-load state, that is, in a state in which the auxiliary device is not operated (S100). The basic backlash preventive torque can be calculated in accordance with function A having parameters consisting of the number of revolutions of the engine 12, the water temperature of the engine, the oil temperature of the engine, and the like.

Then, the preventive ECU 60 detects whether or not the auxiliary device (for example, an air conditioner, an alternator, head lamps and the power steering unit and a generator in a case of a hybrid car) is being operated (S101). This detection is performed in accordance with outputs of sensors connected to the auxiliary device. If operation of the auxiliary device is detected, the load which is increased due to the operation of the auxiliary device, that is, the auxiliary device drive torque is calculated (S102). If the auxiliary device is, for example, the air conditioner, the auxiliary machine drive torque may be torque for operating the air compressor.

Figure 4:
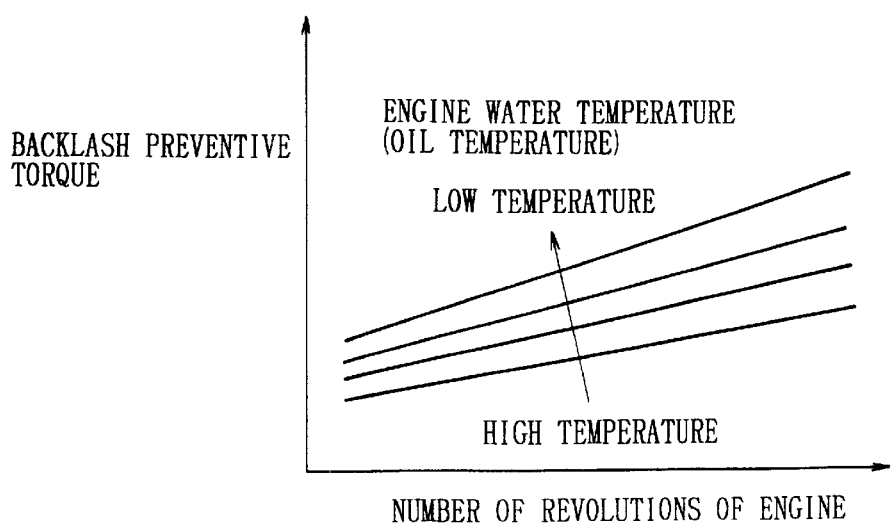
FIG. 4 is a graph showing the relationship between the number of revolutions of an engine, the water temperature (the oil temperature) of the engine and backlash preventive torque according to the first embodiment of the present invention.

The preventive ECU 60 adds the calculated basic backlash preventive torque and the auxiliary machine drive torque to calculate backlash preventive torque B (S103). As shown in FIG. 4, the backlash preventive torque B is increased as the water temperature (the oil temperature) of the engine is lowered or as the number of revolutions of the engine is increased. Moreover, the preventive ECU 60 cancels the backlash of a predetermined quantity by determining a period in which the backlash preventive torque calculated in step S103 is supplied, that is, backlash preventive control period D (S104). The backlash preventive control period is determined in accordance with function D which is determined by the number of revolutions of the engine and the backlash preventive torque. Note that the backlash preventive control period may be expressed by the number of explosion in the engine cylinder in accordance with the number of revolutions of the engine 12. If a determination is made in S101 that the auxiliary device is not being operated, the auxiliary-machine drive torque =0 (S105). Then, the operation is shifted to S103 so that the backlash preventive torque is calculated and the backlash preventive control period is determined.

Figure 5:
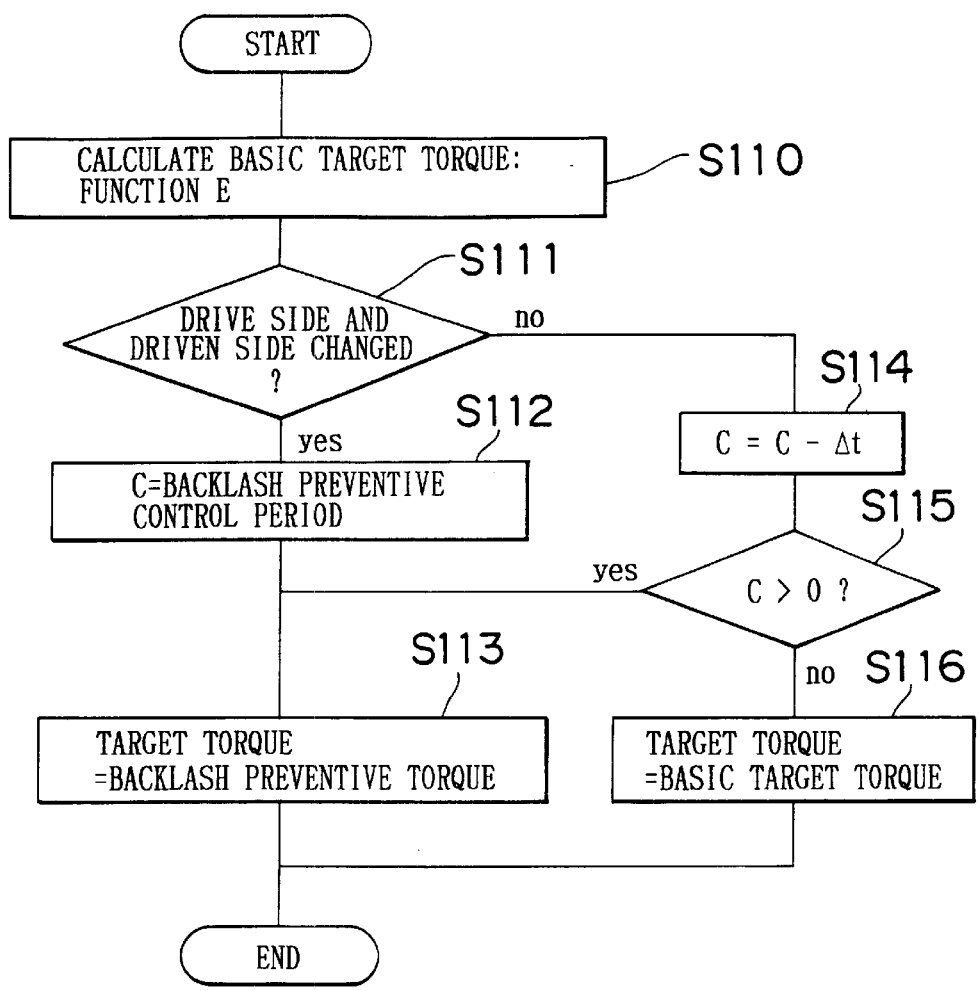
FIG. 5 is a flow chart for controlling the torque of the engine realized during control of the backlash according to the first embodiment of the present invention.

FIG. 5 is a flow chart for controlling the torque of the engine 12 which is performed when the backlash is canceled. First, the ECU 56 calculates a basic target torque which is necessary to realize a vehicle speed (the acceleration) required by a driver in accordance with function E having the degree of opening of the accelerator and the number of revolutions of the engine (S110) as parameters. Then, the ECU 56 detects whether or not the driving state of the engine 12 has changed from the driven side to the driving side (S111). The foregoing determination is made in accordance with whether the idle switch (which is switched on when the accelerator is OFF) is switched on or switched off. When the state of the engine 12 is changed from the driven state to the driving state, that is, when the accelerator has been operated by the driver and, therefore, the idle switch has been switched off, the ECU 56 supplies, to an internal counter C, the calculated value of the backlash preventive control period (S112). Thus, the present target torque is used as the calculated backlash preventive torque to control the engine 12 (S113).

If no change is detected in S111, the ECU 56 subtracts Δt (an execution period of the flow chart shown in FIG. 5) from the internal counter C (S114) to determine whether or not the value of the internal counter C is zero (S115). If C>0, the ECU 56 determines that the backlash has not been canceled. Thus, the operation is shifted to S113 so that issue of an instruction to cause the engine 12 to generate the backlash preventive torque is continued. If a determination that C=0 is made in S115, the ECU 56 uses the basic target torque calculated in S110 as the target torque to cause the engine 12 to generate torque (S116). The foregoing flow chart is repeatedly executed at predetermined intervals of time (for example, 16 ms) or whenever an explosion in the engine 12 occurs.

Figure 6:
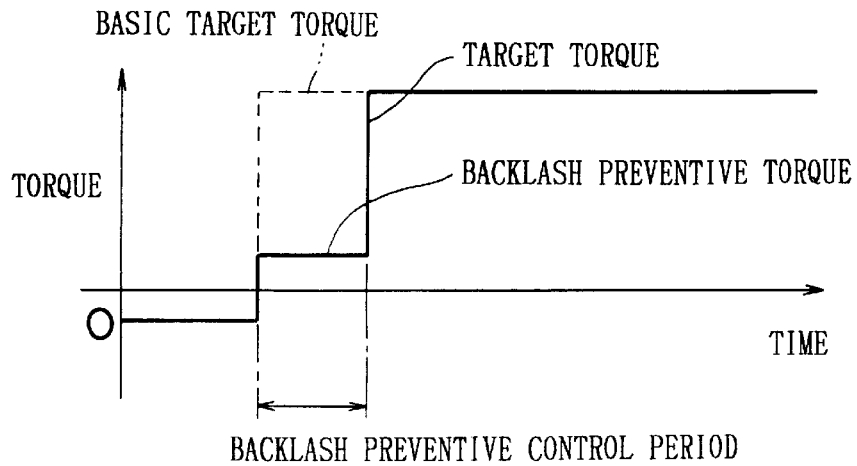
FIG. 6 is a graph showing transition of engine torque according to the first embodiment of the present invention.

FIG. 6 is a timing chart showing change in the torque generated by the engine 12. As shown in FIG. 6, the engine 12 generates only the backlash preventive torque required to cancel the backlash in a state in which the idle switch is switched off, that is, in a state in which the accelerator is depressed. After the backlash has been canceled, the control of the engine 12 is started in accordance with the basic target torque determined in accordance with the degree of opening of the accelerator and the number of revolutions of the engine. Thus, the control is shifted to, for example, speed control required by the driver. As described above, the backlash preventive torque is corrected in accordance with whether or not the auxiliary device is operated. Thus, the torque for maintaining the number of revolutions of the engine required to adequately cancel the backlash and a required control duration required to adequately cancel the backlash can be obtained during an actual operation of the vehicle. Therefore, smooth backlash preventive control can be performed. As a result, vibrations of the vehicle in the longitudinal direction can sufficiently be reduced. Hence it follows that discomfort for a person in the vehicle can be eliminated.

Although the foregoing description has been based on the control which is performed when the acceleration is started with the state of the engine 12 changed from the driven side to the driving side, the foregoing structure may be applied to the case when the deceleration is started with the state of the engine 12 changed from the drive state to the driven state. In this case, the backlash preventive torque is negative torque. When the backing or transient surge preventive control is performed after the backlash preventing period has elapsed, the backlash preventive torque is used as a reference when the control is started. In this case, ideal torque control free from any influence of the backlash can be performed so that vibrations of the vehicle in the longitudinal direction are further reduced.

Second Embodiment

The characteristics of a second embodiment will now be described. When the state of power transmission between the engine 12 and the CVT 14 and the wheels (the vehicle) are switched between the driving state and the driven state, the backlash present in the differential 54 or the like which is a portion of the drive system is canceled. When this cancellation is performed, the output of the engine 12, or at least one of either the output of the engine 12 or the control period of the output of the engine 12, is determined in accordance with a gear ratio of the CVT 14 and the vehicle speed. If the backlash preventive control is performed when the vehicle is accelerated or decelerated, a somewhat long control time is required. Therefore, a delay occurs between the operation performed by the driver and the acceleration/deceleration reaction of the vehicle. On the other hand, vibrations of the vehicle in the longitudinal direction and shock which are felt by a person in the vehicle varies in accordance with the vehicle speed and the speed reduction ratio of the CVT 14. That is, the shock and backing or transient surge caused from the backlash can easily be detected by the person in the vehicle as the gear ratio is high or the vehicle speed is low. Therefore, the magnitude of the backlash preventive torque and the backlash preventive control period (the number of explosions) are determined in accordance with the vehicle speed and the speed reduction ratio of the CVT 14 so that the response of the vehicle and the shock prevention are traded off to perform the operation for canceling the backlash appropriate for the state of driving of the vehicle.

Figure 7:
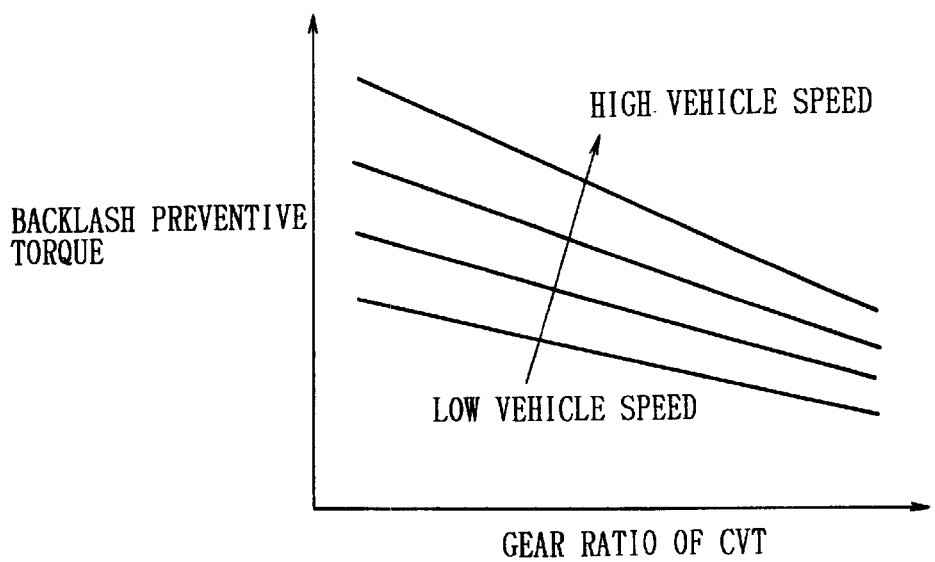
FIG. 7 is a graph showing the relationship between the gear ratio of a CVT, the vehicle speed and a backlash preventive torque according to a second embodiment of the present invention.
Figure 8:
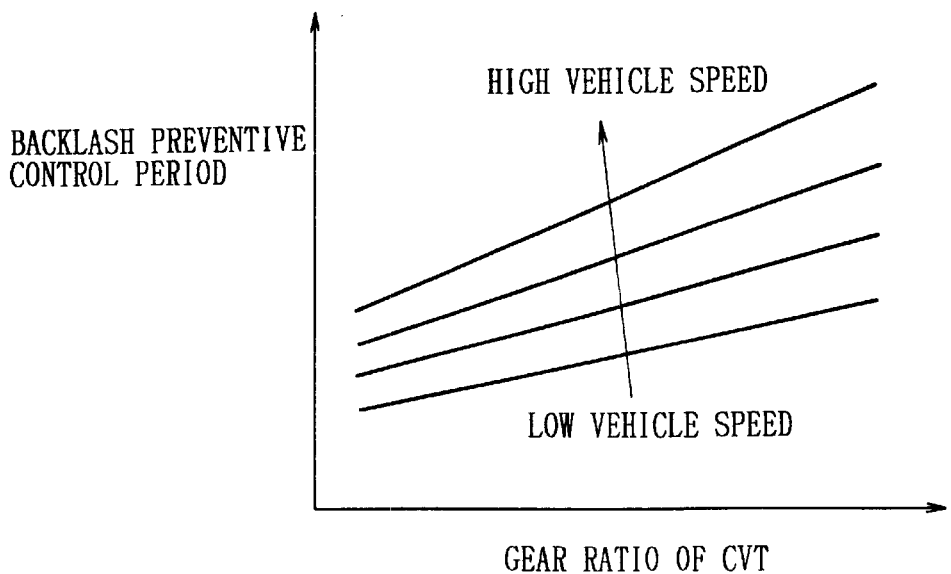
FIG. 8 is a graph showing the relationship between the gear ratio of the CVT, the vehicle speed and the period in which the backlash is controlled according to the second embodiment of the present invention.

FIG. 7 is a map showing the relationship between the gear ratio of the CVT 14, the vehicle speed and the backlash preventive torque. FIG. 8 is a map showing the relationship between the gear ratio of the CVT 14, the vehicle speed and the backlash preventive control period. As described above, the shock and backing or transient surge caused by the backlash can easily be detected by the person in the vehicle as the gear ratio is high and the vehicle speed is low. Therefore, the backlash preventive torque is decreased as the gear ratio of the CVT 14 is raised and the vehicle speed is reduced. Moreover, the backlash preventive control period is elongated. That is, the backlash preventive control is performed slowly to reduce the degree of backing or transient surge and shock which is detected by the person in the vehicle.

Figure 9:
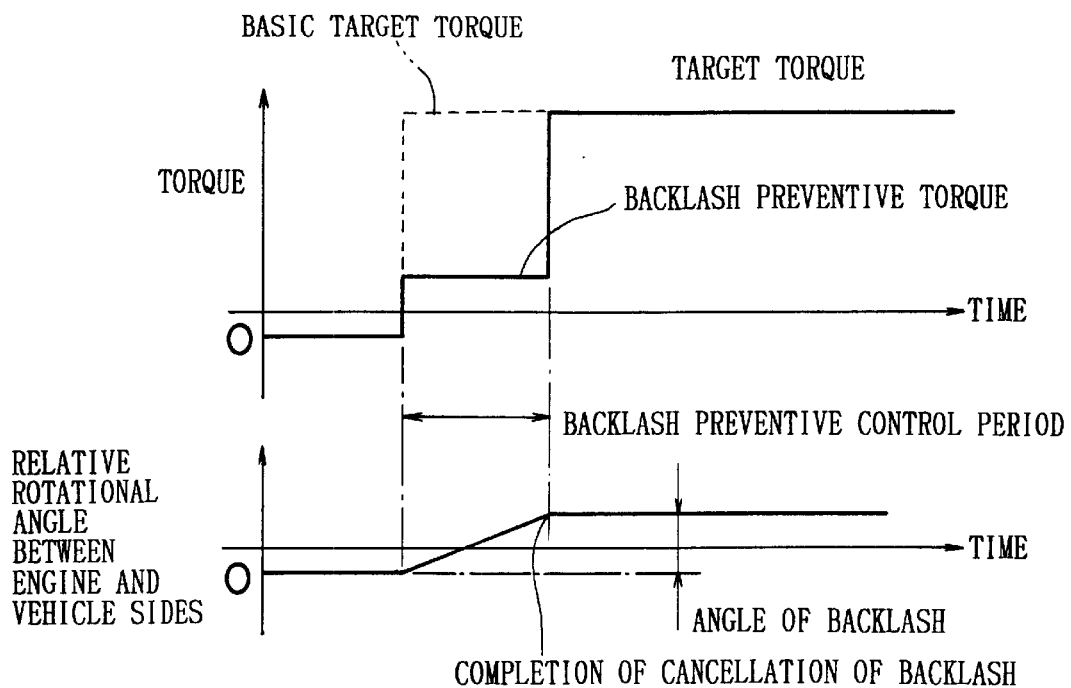
FIG. 9 is a graph showing transition of torque and transition of a relative rotational angle between the engine side and the vehicle side when a person in the vehicle easily recognizes shock according to the second embodiment of the present invention.

FIG. 9 is a timing chart showing transition of torque of the engine 12 and the transition of the relative rotational angle between the engine 12 and the wheels (the vehicle) when the gear ratio of the CVT 14 is high and the vehicle speed is low. Note that a flow chart for controlling the torque of the engine 12 during the backlash prevention is the same as that shown in FIG. 5. As shown in FIG. 9, the backlash is gradually canceled with relatively low torque. Thus, the operation for canceling the backlash can be performed such that no shock is sensed by the person in the vehicle in a state in which the shock or the like can easily be sensed by the person in the vehicle.

Figure 10:
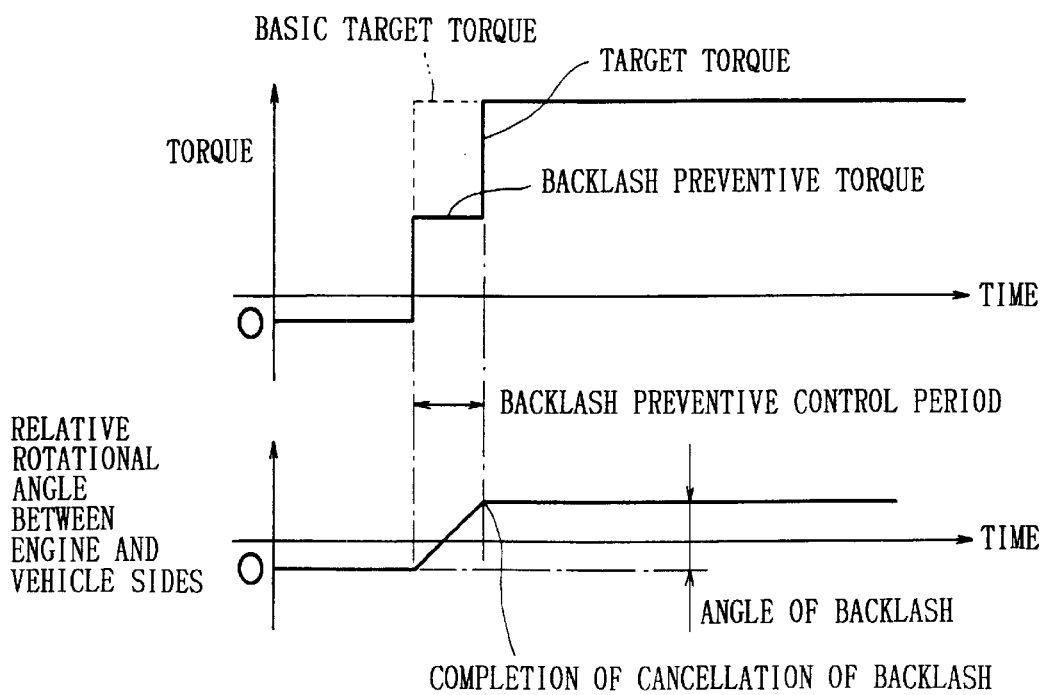
FIG. 10 is a graph showing transition of torque and transition of a relative rotational angle between the engine and the vehicle side when a person in the vehicle cannot easily recognize shock according to a second embodiment of the present invention.

On the other hand, shock and backing or transient surge caused by the backlash cannot easily be detected when the vehicle speed is high. Therefore, the backlash preventive torque is increased when the gear ratio of the CVT 14 is small and the vehicle speed is high to shorten the backlash preventive control period. That is, the backlash preventive control is performed quickly to quickly perform control (for example, backing or transient surge preventive control or acceleration control) of the vehicle after the backlash preventive control has been performed. That is, control is performed such that priority is given to the response of the vehicle. FIG. 10 is a timing chart showing transition of the torque of the engine 12 and that of the relative rotational angle between the engine 12 and the wheels (the vehicle) when the gear ratio of the CVT 14 is small and the vehicle speed is high. As shown in FIG. 10, the backlash is canceled with a relatively great torque so that even if a small shock takes place, the shock is not detected by the person in the vehicle because it is a state where shock is not easily detected. Therefore, the operation for canceling the backlash can quickly be performed such that the shock is not detected by the person in the vehicle. Thus, quick shift to subsequent acceleration control and backing or transient surge preventive control is permitted. As a result, the backlash preventive operation can be performed while discomfort for the person in the vehicle caused from delay of the response is prevented.

Third Embodiment

It is preferable that the backlash preventive control is performed at both a moment of time at which the acceleration is instructed so that the engine 12 is changed from the driven state to the driving state and a moment of time at which the deceleration is instructed so that the engine 12 is changed from the driving state to the driven state. The driver requires different response characteristics between a case in which the driver operates the accelerator to accelerate the vehicle and a case in which the driver releases the accelerator to decelerate the vehicle. That is, a quick response characteristic is required when the vehicle is accelerated. On the other hand, the driver does not require this requirement when the vehicle is decelerated. That is, to smoothly control the vehicle, it is preferable that the backlash preventive control be varied to be adaptable to the state of the vehicle.

The characteristics of the third embodiment will now be described. When the state of power transmission between the engine 12 and the CVT 14 on one hand, and the wheels (the vehicle) on the other hand, are switched between the driving state and the driven state, the backlash present in the differential 54 or the like which is a portion of the drive system is canceled. When the foregoing cancellation is performed, at least one of either the output of the engine 12 or the control duration of the output of the engine 12 is determined in accordance with a direction of change which is caused between the driving state and the driven state.

As described above, when an instruction is issued to perform acceleration to change the engine 12 from the driven state to the driving state, the acceleration control and the backing or transient surge preventive control must be performed. Therefore, it is preferable that the backlash preventive control be completed in a shortest period of time. When an instruction is issued to perform deceleration to change the engine 12 from the driving state to the driven state 1, only a small number of subsequent control operations which need to be completed quickly must be performed. Therefore, a small torque which does not generate backlash is produced at a moment of time at which the amount of reduction in the engine torque is large at the initial stage of the deceleration. Thus, smooth control of torque is slowly performed.

Figure 11:
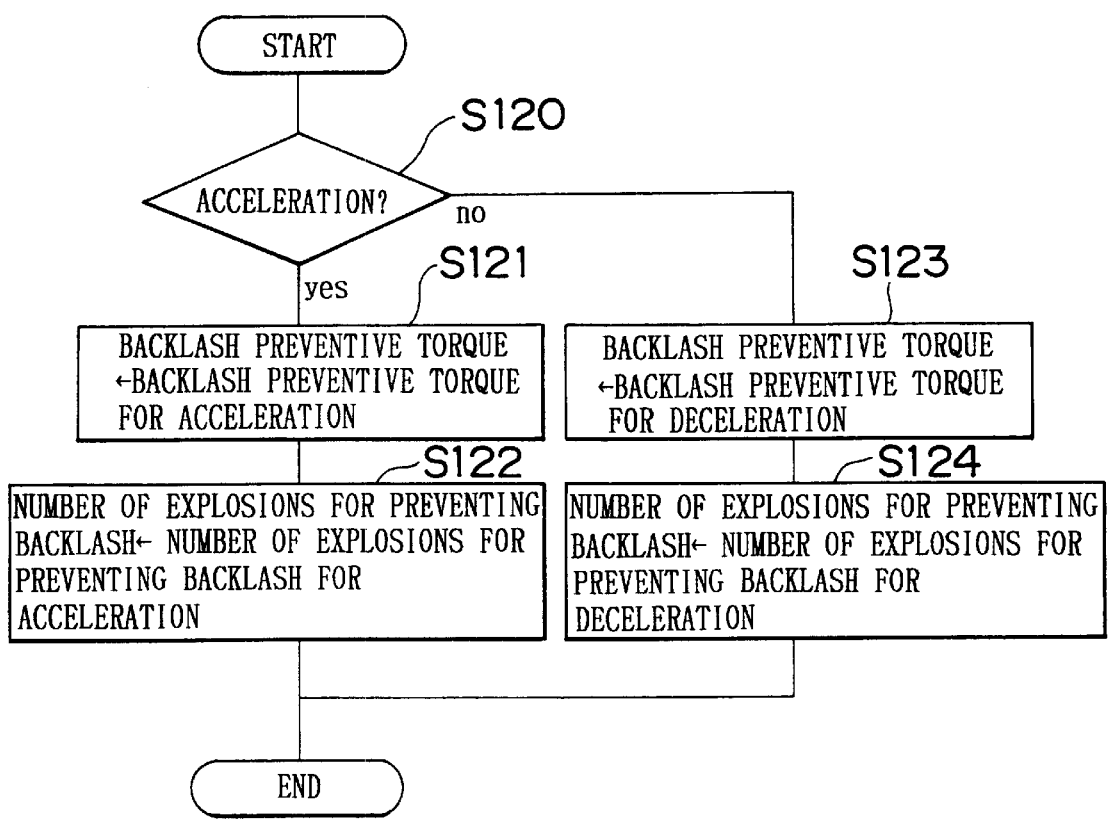
FIG. 11 is a flow chart for use in a third embodiment of the present invention for showing a procedure for determining backlash preventive torque and a backlash preventive control period (the restrained number of explosions) in a state in which the gear change of the CVT is not performed.

FIG. 11 is a flow chart showing a procedure for determining the backlash preventive torque and the backlash preventive control period (restrained number of explosions) in a state in which gear change of the CVT 14 is not performed. The preventive ECU 60 shown in FIG. 1 determines whether the vehicle is in an acceleration state in accordance with whether the idle switch is switched on or off (S120). If the preventive ECU 60 detects the acceleration state of the vehicle, the preventive ECU 60 determines backlash preventive torque in accordance with a predetermined backlash preventive torque map for acceleration (similar to that shown in FIG. 7) (S121). Similarly, the preventive ECU 60 determines the backlash preventive control period (restrained number of explosions) in accordance with a predetermined backlash preventive control period (the restrained number of explosions) map for acceleration (similar to that shown in FIG. 8) (S122). If it is determined by the preventive ECU 60 in S120 that the state is the vehicle deceleration state, the preventive ECU 60 determines the backlash preventive torque in accordance with a predetermined backlash preventive torque map (similar to that shown in FIG. 7) for deceleration (S123). Similarly, the preventive ECU 60 determines the backlash preventive control period (the restrained number of explosions) in accordance with a predetermined backlash preventive control period (the restrained number of explosions) map for deceleration (similar to that shown in FIG. 8) (S124). This flow chart control is repeatedly performed at intervals of predetermined periods of time. After the backlash preventive torque and the backlash preventive control period (the restrained number of explosions) have been determined, the torque of the engine 12 is controlled in accordance with the flow chart shown in FIG. 5. The transition of the torque of the engine 12 during the acceleration is similar to that shown in FIG. 10. Also the transition of the torque of the engine 12 during the deceleration is similar to that shown in FIG. 9.

As described above, the backlash preventive torque and the backlash preventive control period (the restrained number of explosions) are determined in accordance with the different maps between the acceleration state and the deceleration state. Thus, backlash preventive control adaptable to the state of driving of the vehicle can be performed.

Figure 12:
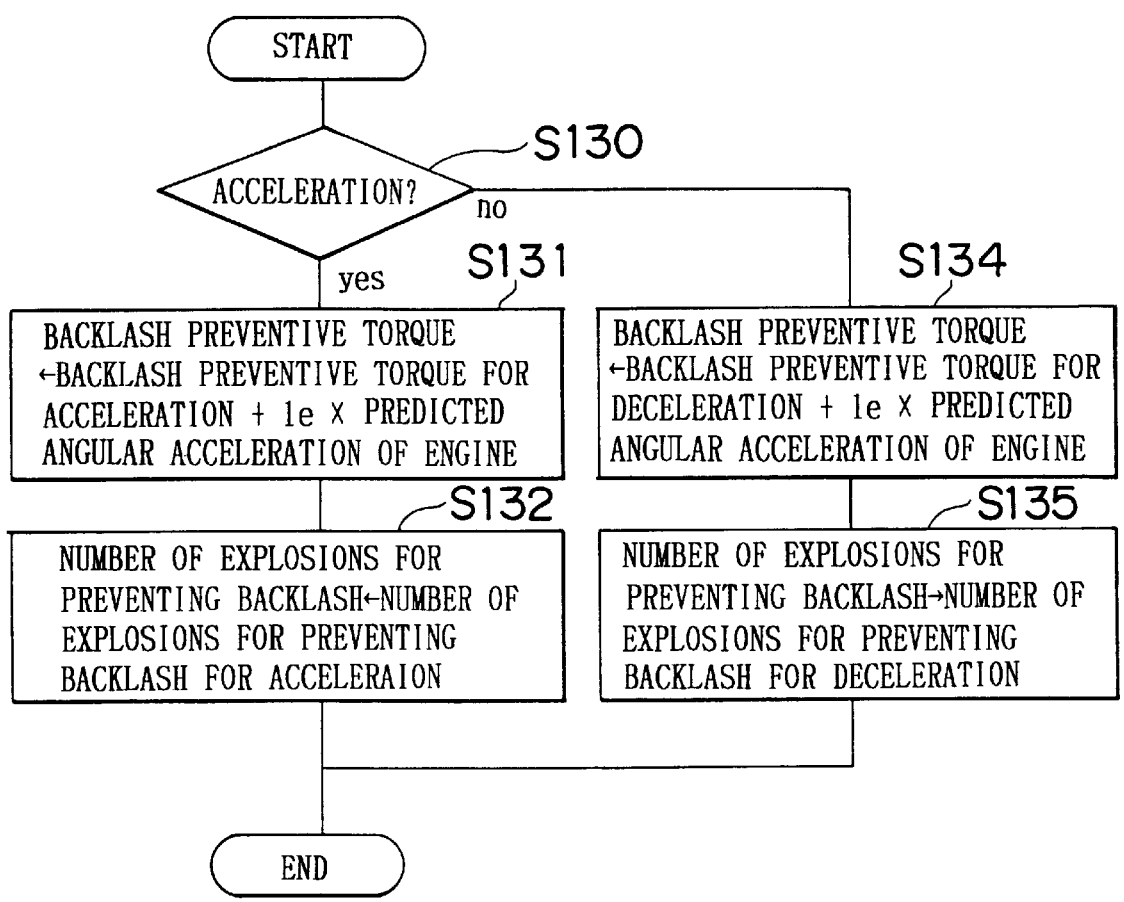
FIG. 12 is a flow chart for use in the third embodiment of the present invention for showing a procedure for determining backlash preventive torque and a backlash preventive control period (the restrained number of explosions) in a state in which the gear change of the CVT is performed.

FIG. 12 is a flow chart showing a procedure for determining the backlash preventive torque and the backlash preventive control period (the restrained number of controls) in a state in which the gear ratio of the CVT 14 is changed. The preventive ECU 60 shown in FIG. 1 determines whether the vehicle is in an accelerated state in accordance with whether the idle switch is switched on or off (S130). If the preventive ECU 60 detects the acceleration state of the vehicle, the preventive ECU 60 employs, as the backlash preventive torque, the sum of torque obtained from the predetermined backlash preventive torque map (similar to that shown in FIG. 7) for acceleration, that is, the torque required to increase the number of revolutions of the engine and torque (engine inertia moment 1e×predicted angular acceleration of engine) required to follow rise in the rotation occurring owing to the gear change (S131). Moreover, the backlash preventive control period (the restrained number of explosions) is determined in accordance with the predetermined backlash preventive control period (the restrained number of explosions) map (similar to that shown in FIG. 8) for acceleration (S132).

When it is determined by the preventive ECU 60 in S130 that the vehicle is in the deceleration state, the preventive ECU 60 employs, as the backlash preventive torque, the sum of torque obtained from the predetermined backlash preventive torque map (similar to that shown in FIG. 7) for deceleration, that is, the torque required to increase the number of revolutions of the engine, and torque (engine inertia moment 1e×predicted angular acceleration of engine) required to follow rise in the rotation occurring owing to the gear change (S134). Moreover, the backlash preventive control period (the restrained number of explosions) is determined in accordance with the predetermined backlash preventive control period (the restrained number of explosions) map (similar to that shown in FIG. 8) for deceleration (S135). This flow chart control is repeatedly performed at intervals of predetermined periods of time. After the backlash preventive torque and the backlash preventive control period (the restrained number of explosions) have been determined, the torque of the engine 12 is controlled in accordance with the flow chart shown in FIG. 5. The transition of the torque of the engine 12 in the acceleration state is similar to that shown in FIG. 10, while the transition of the torque of the engine 12 in the deceleration state is similar to that shown in FIG. 9.

As described above, the backlash preventive torque and the backlash preventive control period (the restrained number of explosions) are determined in accordance with the different maps between the acceleration state and the deceleration state even in the case where the speed reduction ratio of the CVT 14 is changed, which permits an appropriate backlash preventive control for vehicle drive state. Thus, discomfort for the person in the vehicle caused by shock and backing or transient surge can be prevented. Moreover, driving of the vehicle can smoothly be performed.

Fourth Embodiment

Figure 13:
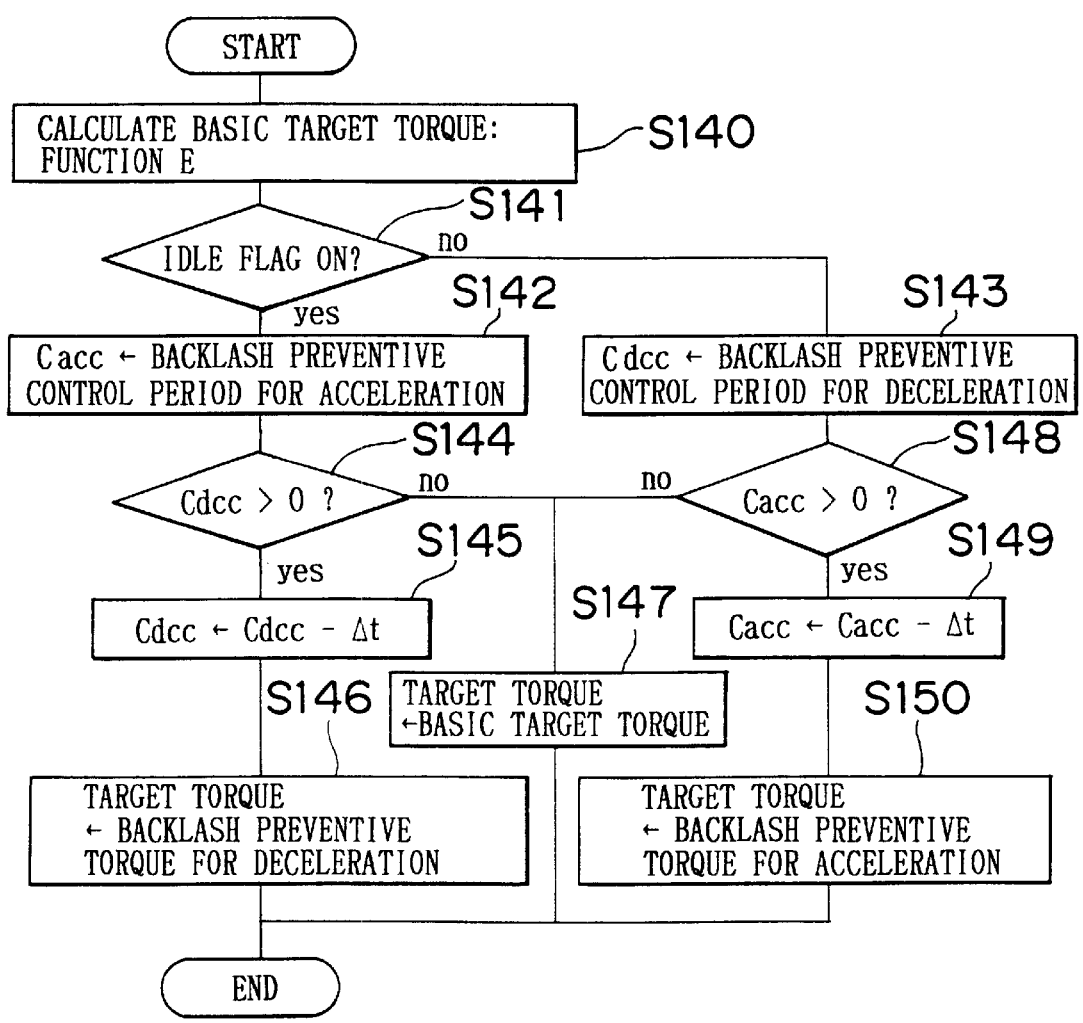
FIG. 13 is a flow chart showing a fourth embodiment of the present invention to describe a determination which is made whether or not the backlash preventive control is performed in accordance with whether an idle switch is switched on/off.

In each of the above-mentioned embodiments, the determination to execute the backlash preventive control in the acceleration state and that in the deceleration state are performed in accordance with whether the idle switch is turned on or off. An example shown in FIG. 13 describes in detail the determination to execute the backlash preventive control in accordance with whether the idle switch is turned on or off.

First, the preventive ECU 60 shown in FIG. 1 calculates a basic target torque of the vehicle requested by the driver in accordance with function E having parameters which are the degree of opening of the accelerator and the number of revolutions of the engine 12 (S140). Then, the ECU 56 determines whether or not the idle switch is turned on, that is, whether or not an idle flag is turned on (S141). If the idle flag is turned on, the ECU 56 selects the backlash preventive control period for acceleration from a map based on the gear ratio of the CVT 14 and the vehicle speed similar to that shown in FIG. 8 to input the value into an internal counter C acc (S142). If the idle flag is not turned on in S141, that is, if the accelerator has been turned on and an instruction to accelerate the vehicle has been issued, the ECU 56 selects the backlash preventive control period for deceleration from a map based on the gear ratio of the CVT 14 and the vehicle speed and similar to that shown in FIG. 8 to input the value into an internal counter C dcc (S143). If a determination is performed in S141 that the idle flag is turned on and the internal counter C acc is updated in S142, the ECU 56 determines whether or not the internal counter C dcc is zero (S144). If the internal counter C dcc>0, predetermined value Δt (which is "1" when the internal counter C dcc counts the number of explosions in the engine) is subtracted from the internal counter C dcc (S145). Then, the backlash preventive torque for deceleration selected from the map based on the gear ratio of the CVT 14 and the vehicle speed and similar to that shown in FIG. 7 is inputted into the target torque for the engine 12. Thus, the backlash preventive control is performed (S146). If the internal counter C dcc=0 in S144, the ECU 56 determines that the backlash preventive control has been completed. Thus, the ECU 56 inputs the basic reference torque obtained in S140 into the target torque for the engine 12 so that the control of the engine 12 is continued (S147).

If a determination is made in S141 that the idle flag has been turned off and the internal counter C dcc is updated in S143, the ECU 56 determines whether or not the internal counter C acc is zero (S148). If the internal counter C acc>0, a predetermined value Δt (which is 1 when the internal counter C acc counts the number of explosions in the engine) is subtracted from C acc (S149). Then, backlash preventive torque for acceleration selected from the map based on the gear ratio of the CVT 14 and the vehicle speed which is similar to that shown in FIG. 7 is inputted into the target torque for the engine 12. Thus, the backlash preventive control is performed (S150). If the internal counter C acc=0 in S148, the ECU 56 determines that the backlash preventive control has been completed. Thus, the ECU 56 inputs the basic reference torque obtained in S140 into the target torque for the engine 12. Thus, the control of the engine 12 is continued (S147).

As described above, the state of the vehicle can easily be recognized in accordance with whether the idle switch (the idle flag) has been turned on or off. Therefore, adequate backlash preventive control can quickly be performed. Also, in steps S142 and S143, backlash preventive control period for the opposite state is inputted to the internal counter, such that when acceleration and deceleration occurs in a subsequent step, that is, when the idle flag is changed, continuing processing can be performed quickly. As a result, smooth backlash preventive control can be performed.

Fifth Embodiment

Figure 14:
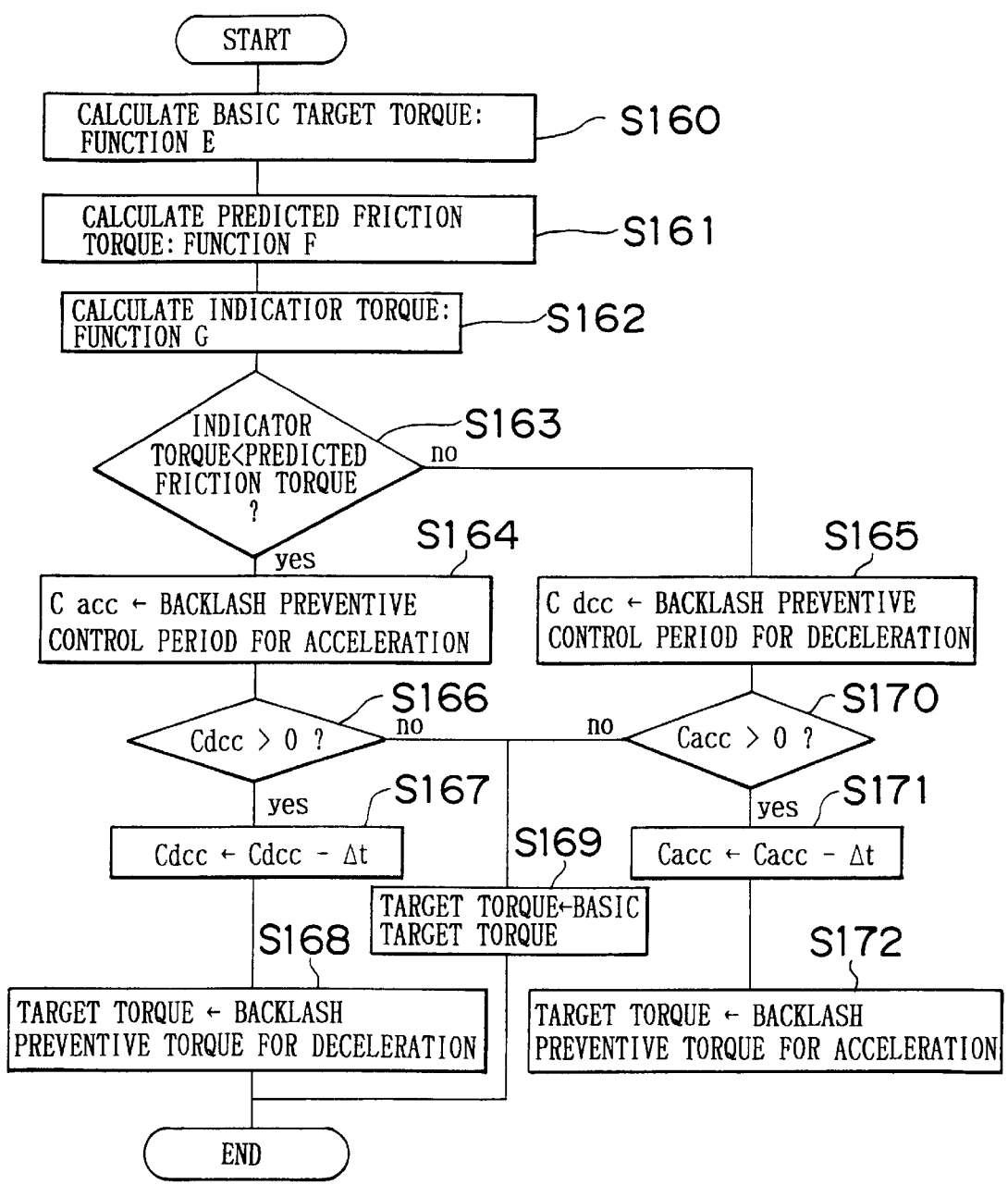
FIG. 14 is a flow chart showing a fifth embodiment of the present invention to describe a determination of whether the engine is in an accelerated state or in a decelerated state by making a comparison between indicator torque and predicted friction torque.

FIG. 14 shows a method of determining whether the vehicle is in the acceleration state or the deceleration state by means other than the idle switch. In this case, indicator torque which is determined in accordance with the number of cylinders or the amount of fuel injection of the engine 12 and a predicted friction driven are compared with each other.

Thus, a determination is made whether the engine 12 is in the acceleration state or the deceleration state. The indicator torque is torque obtained from and indicator diagram, the indicator torque being torque output from the engine 12 by combustion. A value obtained by subtracting the friction torque of the engine 12 from the indicator torque is the actual output torque. Therefore, a result of the comparison between the magnitude of the indicator torque and that of the friction torque is used to determine whether the vehicle is in the acceleration state or the deceleration state. With the foregoing idle switch, the actual timing of the switch between acceleration and deceleration is sometimes shifted owing to the response performance of the switch or the like. When the result of the comparison between the indicator torque and the friction torque is used, the comparison is made between torques directly related the rotations of the engine. Therefore, accurate determination of the switch between the acceleration and the deceleration can be performed.

As shown by the flow chart shown in FIG. 14, the ECU 56 calculates basic target torque requested by the driver in accordance with function E having as parameters the degree of opening of the accelerator and the number of revolutions of the engine (S160). Then, the ECU 56 calculates predicted friction torque of the engine 12 in accordance with function F having as parameters the number of revolutions of the engine, the engine water temperature, the engine oil temperature and whether or not an auxiliary device is being operated (S161). Moreover, indicator torque obtained is calculated in accordance with (a conversion coefficient) the number of cylinders×amount of fuel injection (S162). Then, the calculated indicator torque and the predicted friction torque are compared with each other (S163). If the indicator torque<the predicted friction torque, that is, if the engine 12 is in the driven state, the ECU 56 selects the backlash preventive control period for acceleration from a map which is similar to that shown in FIG. 8 and which is based on the gear ratio of the CVT 14 and the vehicle speed, and the selected value is inputted into the internal counter C acc (S164). If the relationship indicator torque<predicted friction torque is not satisfied in S163, that is, the engine 12 is in the driving state, the ECU 56 selects the backlash preventive control period for deceleration from the map which is similar to that shown in FIG. 8 and which is based on the gear ratio of the CVT 14 and the vehicle speed, and the selected value is inputted into the internal counter C dcc (S165). If a determination is made in S163 that the indicator torque <the predicted friction torque and the internal counter C acc is updated in S164, the ECU 56 determines whether or not the internal counter C dcc is zero (S166). If the internal counter C dcc>0, a predetermined value Δt (which is 1 when the internal counter C dcc counts the number of explosions in the engine) is subtracted from internal counter C dcc (S167). Then, the ECU 56 inputs the backlash preventive torque for deceleration selected from the map similar to that shown in FIG. 7 and which is based on the gear ratio of the CVT 14 and the vehicle speed into target torque for the engine 12. Thus, the ECU 56 performs the backlash preventive control (S168). If the internal counter C dcc=0 in S163, the ECU 56 determines that the backlash preventive control has been completed. Thus, the ECU 56 inputs the basic reference torque obtained in S160 into the target torque for the engine 12 so that the control of the engine 12 is continued (S169).

If the ECU 56 determines in S163 that the indicator torque<predicted friction torque, and updates the internal counter C dcc in S165, the ECU 56 determines whether or not the internal counter C acc is zero (S170). If the internal counter C acc>0, the ECU 56 subtracts a predetermined value Δt (which is one when the internal counter C acc counts the number of explosions in the engine) from C acc (S171). Then, the ECU 56 inputs the backlash preventive torque for acceleration selected from the map which is similar to that shown in FIG. 7 and which is based on the gear ratio of the CVT 14 and the vehicle speed into the target torque for the engine 12 so that the backlash preventive control is performed (S172). If the internal counter C acc=0 in S170, the ECU 56 determines that the backlash preventive control has been completed and inputs the basic reference torque obtained in S160 into the target torque for the engine 12 so as to continue the control of the engine 12 (S169).

As described above, the relationship between the magnitudes of the indicator torque and the predicted friction torque is used to easily and accurately recognize the state of the vehicle. Thus, adequate backlash preventive control can quickly be performed. As a result, discomfort for the person in the vehicle can be prevented. Moreover, driving of the vehicle can be smoothly performed. Also, in steps S164 and S165, the backlash preventive control period for the opposite state is inputted to the internal counter, such that when acceleration and deceleration occurs in a subsequent step, that is, when the magnitude of torque is changed, continuing processing can be performed quickly. As a result, smooth backlash preventive control can be performed.

Sixth Embodiment

In each of the foregoing embodiments, the amount of the backlash was assumed to be known when the drive system was designed. Therefore, an adequate-value is selected in accordance with the map previously produced in order to cancel the amount of the backlash so as to determine the backlash preventive control period. In these cases, however, the value is obtained at a variety of points to determine the backlash preventive control period. As a result, a great calculation load must be borne to complete the process. Thus, there is apprehension that the overall control becomes too complicated. The flow chart shown in FIG. 1 is structured to determine the backlash preventive control period by a simple method.

First, the ECU 56 calculates the basic target torque requested by the driver in accordance with function E having as parameters the degree of opening of the accelerator and the number of revolutions of the engine (S180). Then, the ECU 56 determines whether or not the idle switch is turned on, that is, whether or not the idle flag is turned off (S181). If the idle flag is turned on, the ECU 56 inputs the backlash preventive control period for acceleration, which is a fixed value, into the internal counter C acc (S182). The backlash preventive control period for acceleration is the value for operating the counter. Moreover, the foregoing value is a fixed value also serving as backup against a failure of, for example, the vehicle speed sensor for detecting the vehicle speed which serves as a reference for the determination to be described later. If the idle flag is not turned on in S181, that is, if the accelerator is turned on and an instruction to perform acceleration is issued, the ECU 56 inputs the backlash preventive control period for deceleration which is a fixed value into the internal counter C dcc, similarly to the foregoing process (S183).

If a determination is made in S181 that the idle flag is turned on and the internal counter C acc is updated in S182, the ECU 56 determines whether or not the internal counter C dcc is zero (S184). If internal counter C dcc>0, the ECU 56 makes a comparison between the present vehicle speed and a value obtained by subtracting adjustment value β (zero or a positive value) which is determined in consideration of noise of a vehicle speed signal and the like (S185), from a previous vehicle speed obtained a predetermined time before. In case of a first process, the previous vehicle speed used is a vehicle speed obtained a predetermined time before. In the second and subsequent processes, the vehicle speed in the previous process is used. When present vehicle speed<previous vehicle speed–β, that is, when deceleration has been performed, a determination is made that the backlash has been canceled and the torque of the engine 12 has been changed. Thus, zero is inputted into the internal counter C dcc (resetting is performed) (S186). Then, the ECU 56 starts controlling the engine such that the basic target torque calculated in S180 is used as the target torque for the engine 12 (S187). If the ECU 56 determines in S185 that the relationship that present vehicle speed<the previous vehicle speed–β is not satisfied, that is, if backlash is present in the drive system and the engine 12 does not exert an influence on the vehicle speed, the ECU 56 subtracts a predetermined value Δt (which is 1 when the internal counter C dcc counts the number of explosions) from C dcc (S188). Then, the ECU 56 inputs the backlash preventive torque for deceleration selected from the map which is similar to that shown in FIG. 7 and which is based on the gear ratio and the vehicle speed into the target torque for the engine 12 to perform the backlash preventive control (S189).

If a determination is made in S181 that the idle flag has been turned off and the internal counter C dcc has been updated in S183, the ECU 56 determines whether or not the internal counter C acc is zero (S190). If the internal counter C acc>0, a comparison is made between the present vehicle speed and a value obtained by adding adjustment value α (zero or a positive value) determined in consideration of noise of vehicle speed signal to the previous vehicle speed before a predetermined period of time (S191). Also in this case, in a first process, the previous vehicle speed used is a vehicle speed obtained a predetermined time before. In second and subsequent processes, the vehicle speed in the previous process is used. If the present vehicle speed>the previous vehicle speed+α, that is, if acceleration has occurred, a determination is made that the backlash has been canceled and the torque of the engine 12 has been changed. Thus, zero is inputted into the internal counter C acc (that is, resetting is performed)(S192). Then, the ECU 56 starts controlling the engine such that the basic target torque calculated in S180 is used as the target torque for the engine 12 (S187). If the ECU 56 determines in S191 that the relationship that the present vehicle speed>the previous vehicle speed+α is not satisfied, that is, if backlash is present in the drive system and the engine 12 does not exert an influence on the vehicle speed, a predetermined value Δt (which is 1 when the internal counter C acc counts the number of explosions in the engine)is subtracted from C acc (S193). Then, the ECU 56 inputs the backlash preventive torque for deceleration selected from the map which is similar to that shown in FIG. 7 and which is based on the gear ratio of the CVT 14 and the vehicle speed into the target torque for the engine 12 so as to perform the backlash preventive control (S194).

Figure 15:
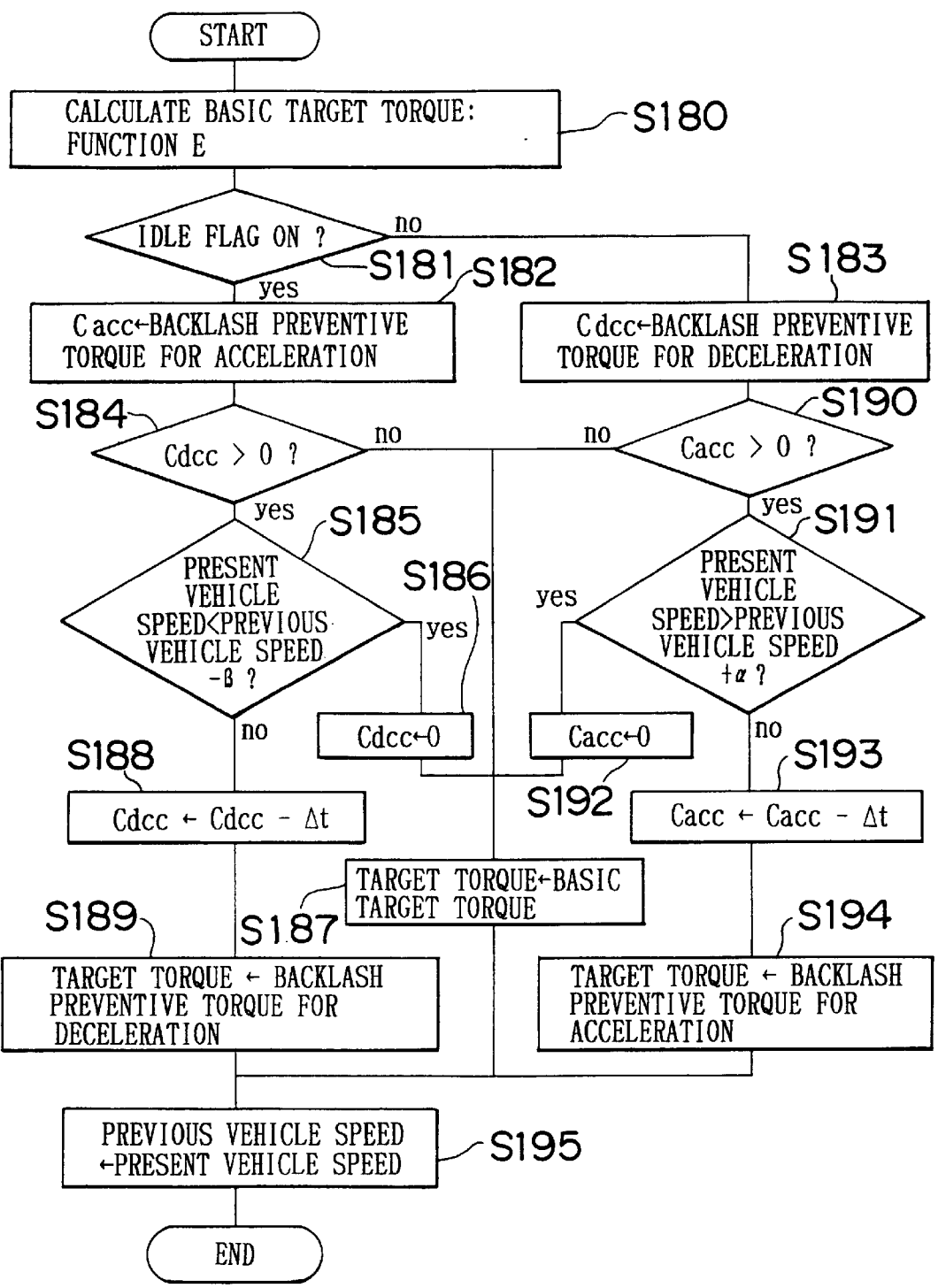
FIG. 15 is a flow chart showing a sixth embodiment to describe a determination of a backlash preventive control period in accordance with change in the vehicle speed.

If the target torque is determined in S187, S189 or S194, the present vehicle speed is inputted for the previous vehicle speed (S195). After a predetermined time has elapsed, for example, after time Δt has elapsed, the control according to the flow chart shown in FIG. 15 is started. In a case where the vehicle speed is low, the previous vehicle speed and the present vehicle speed are sometimes not different from each other. In that case, intervals of restart of the flow chart must be made to be 500 ms or 1 s.

As described above, a change in the vehicle speed or the like which occurs at the instant when the backlash has been canceled in the direction in which the power of the drive system is transmitted is detected so that the completion of the backlash preventive control period can be easily predicted. As a result, the backlash can be canceled while simplifying the overall control. Also, discomfort for a person in the vehicle can be prevented and driving of the vehicle can smoothly be performed.

Seventh Embodiment

In each of the foregoing embodiments, the torque of the engine 12 is mainly controlled in a so-called acceleration state in which the engine 12 is changed from the driven state to the driving state so that the backlash present in the drive system is canceled. However, the backlash can also be canceled by temporarily delaying the rotational speed of the drive system of the backlash which is governed by the vehicle speed compared to the engine 12 side. Therefore, a seventh embodiment is structured such that the gear ratio of the CVT 14 is actively controlled to cancel the backlash.

Figure 16:
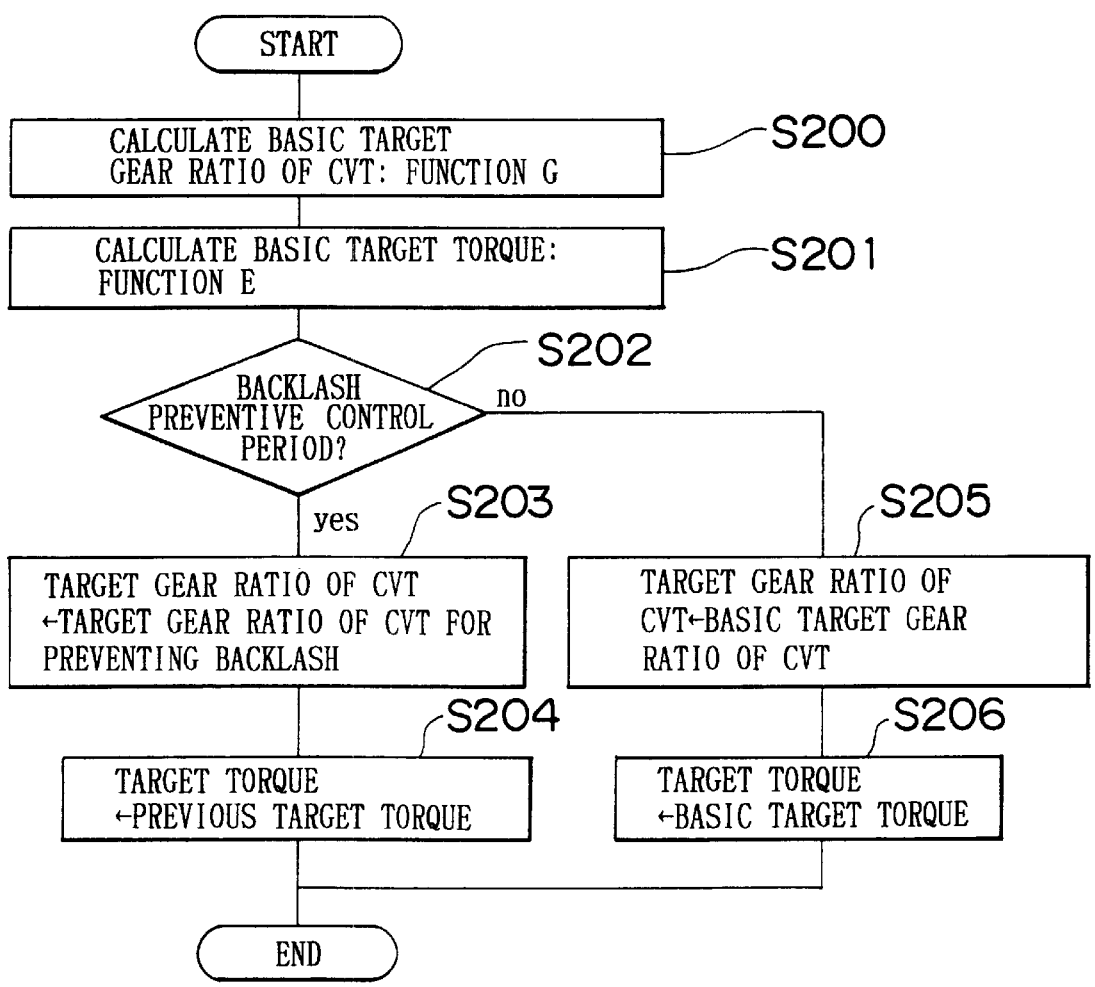
FIG. 16 is a flow chart showing a seventh embodiment of the present invention to describe an operation for canceling backlash by actively controlling the gear ratio of the CVT.

Referring to a flow chart shown in FIG. 16, the preventive ECU 60 shown in FIG. 1 issues an instruction to the ECU 58 to calculate a basic target gear ratio of the CVT. The ECU 58 calculates the basic target gear ratio of the CVT for realizing the vehicle speed required by the driver in accordance with function G having as parameters the degree of opening of the accelerator and the vehicle speed (S200). Then, the preventive ECU 60 issues an instruction to the ECU 56 to calculate the basic target torque. The ECU 56 calculates the basic target torque for realizing the vehicle speed requested by the driver in accordance with function E having as parameters the degree of opening of the accelerator and the number of revolutions of the engine (S201). Then, the preventive ECU 60 determines whether or not the present period is the backlash preventive control period (S202). When, for example, the idle switch is changed from ON to OFF, the counter is set to a predetermined period of time. If the counter is being operated, it is determined that the present period is the backlash preventive control period.

Figure 17:
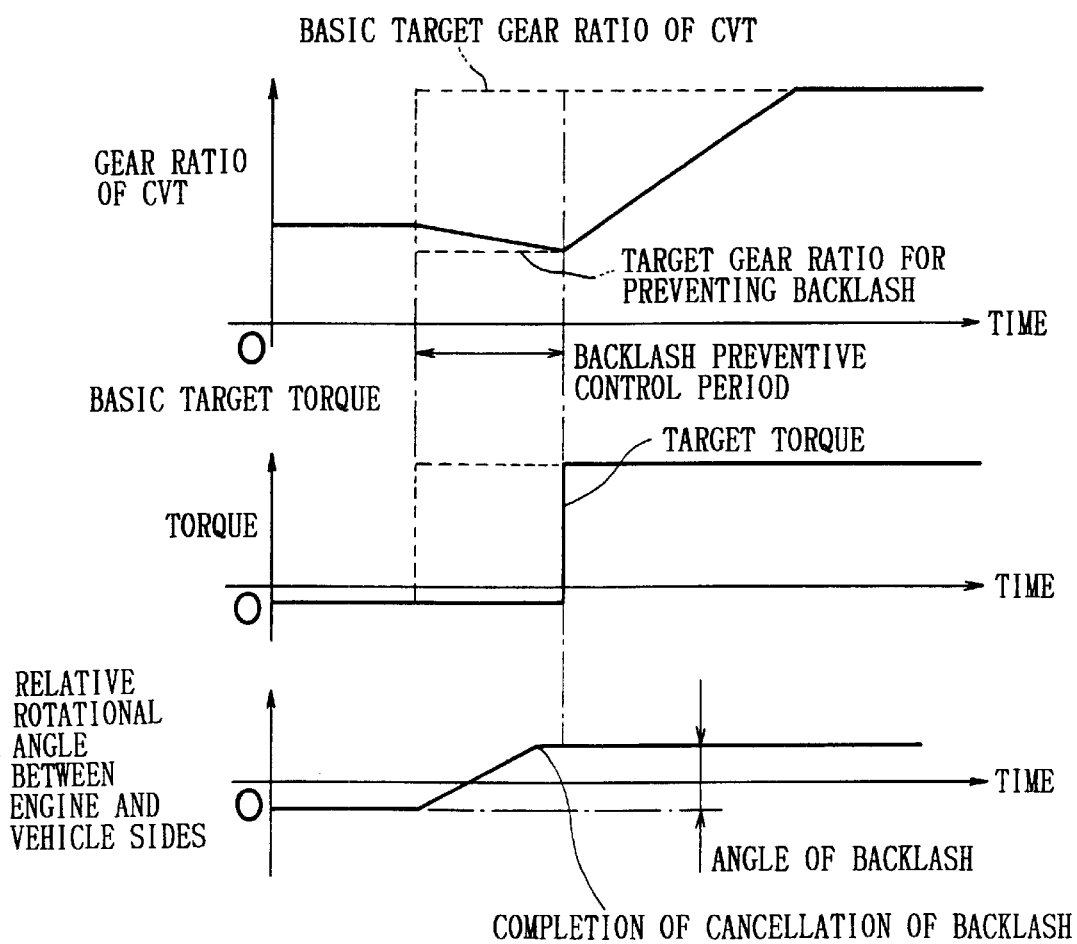
FIG. 17 is a graph showing transition of the gear ratio of the CVT, that of the engine torque and that of a relative rotational angle between the engine side and the vehicle side according to a seventh embodiment of the present invention.

If the preventive ECU 60 determines in S202 that the present period is the backlash preventive control period, the ECU 58 inputs the target gear ratio of the CVT for preventing backlash as the value of the target gear ratio of the CVT to continuously make transition to the target gear ratio of the CVT for preventing backlash (S203). The target gear ratio of the CVT for preventing backlash is a gear ratio which is determined in accordance with the previous gear ratio of the CVT and the vehicle speed. The foregoing gear ratio is obtained by shifting the present gear ratio by a predetermined ratio to a speed increase side. In the upper column in FIG. 17, a transition of change in the gear ratio of the CVT is shown. At this time, the ECU 56 uses the target torque in the previous process as the target torque to maintain the torque (delay the change in the torque) (S204). That is, the ECU 56 performs control to maintain the torque of the engine 12.

As described above, the gear ratio of the CVT 14 is changed toward the speed increase side during the backlash preventive control period to maintain the torque of the engine 12. Therefore, the rotational speed of the drive system of the backlash which changes in response to changes in the vehicle speed can be delayed as compared with the engine 12. As a result, the backlash present in the drive system can be canceled by controlling the gear ratio of the CVT 14. In intermediate and lower columns of FIG. 17, there is shown transition of the torque of the engine 12 and the relative rotational angle between the engine 12 and the vehicle, that is, the change in the amount of the backlash corresponds to the transition of the gear ratio of the CVT 14.

If the preventive ECU 60 determines in S202 that the present period is not the backlash preventive control period, the ECU 58 inputs the basic target gear ratio of the CVT calculated in S200 as the value of the target gear ratio of the CVT to continuously make transition of the gear ratio of the CVT 14 to the basic target gear ratio of the CVT (S205). At this time, the ECU 56 employs the basic target torque calculated in S201 as the target torque (S206) so that the acceleration control or the like of the vehicle required by the driver is performed.

As described above, the CVT 14 is actively controlled so that freedom of the backlash preventive control can be improved. Therefore, discomfort for a person in the vehicle caused from shock or backing or transient surge can be prevented. Moreover, driving of the vehicle can be smoothly performed.

Eighth Embodiment

In the seventh embodiment, the rotational speed of the drive system is temporarily delayed as compared with that of the engine 12 to cancel the backlash. In examples shown in FIGS. 18 through 21, both the engine 12 and the vehicle sides are accelerated to cancel the backlash. That is, for example, when the acceleration is started in which the engine 12 is changed from the driven state to the driving state, the CVT is shifted to the speed decrease side such that the rotational speed of the rotational portion (as a conversion to the gear ratio) of the wheels (the vehicle) is raised slightly slower than the rise in the rotation of the engine 12 due to increase in the engine torque. As an alternative to this, torque is generated such that the rotational speed of the engine side is raised slightly faster than the rise in the rotational speed caused by change in the speed of the wheel (vehicle) portion. As a result, the engine 12 and the wheels (the vehicle) are permitted to be operated in the same direction at a small relative speed. Therefore, the backlash can be smoothly canceled.

Figure 18:
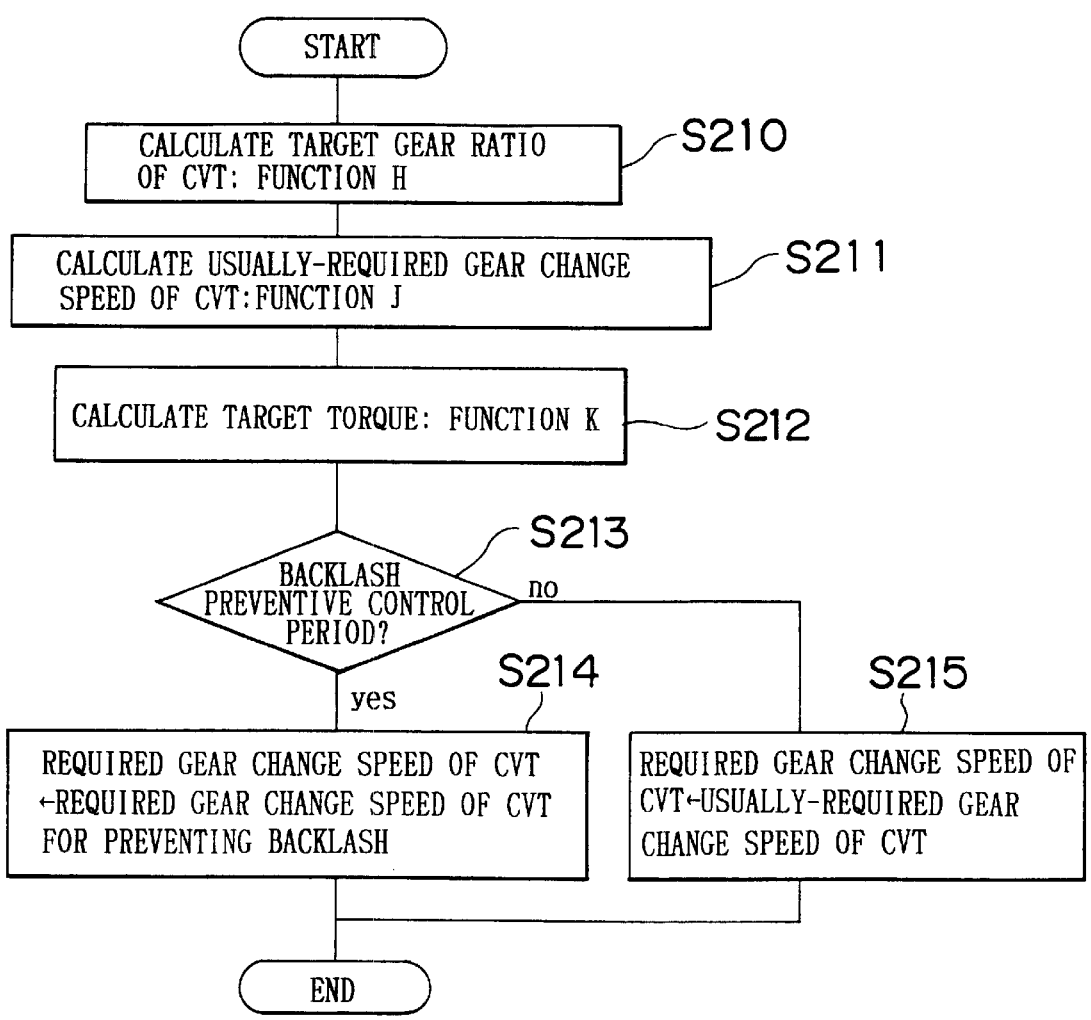
FIG. 18 is a flow chart showing an eighth embodiment of the present invention to describe backlash prevention which is performed by raising/reducing the gear change speed of the CVT.
Figure 19:
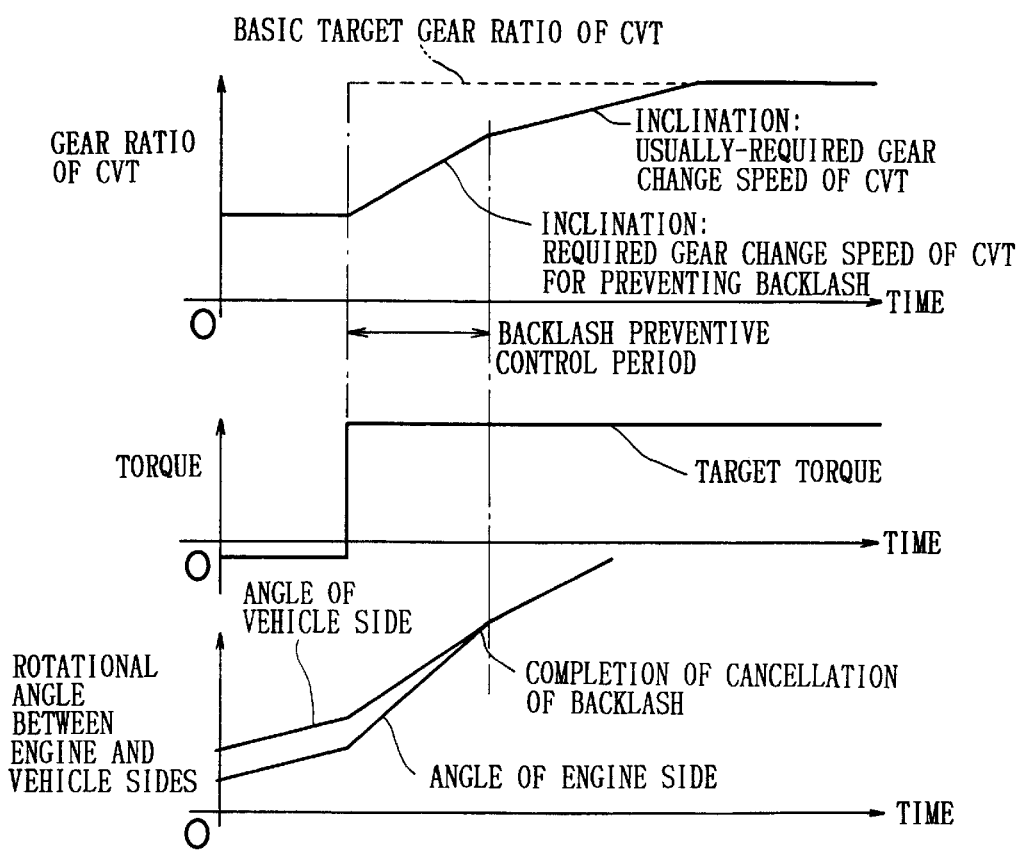
FIG. 19 is a graph showing transition of the gear ratio of the CVT, that of the engine torque and that of the rotational angles of the engine side and the vehicle side according to the eighth embodiment when the gear change speed of the CVT has been changed.

FIG. 18 is a flow chart for controlling the engine 12 when the acceleration is started, that is, when the engine 12 is changed from the driven state to the driving state. Specifically, the gear change speed of the CVT 14 is adjusted to cancel the backlash. The ECU 58 shown in FIG. 1 calculates the target gear ratio of the CVT which is necessary to obtain the speed required by the driver in accordance with function H having as parameters the present degree of opening of the accelerator and the vehicle speed (S210). Then, the ECU 58 calculates a usually-required gear change speed of the CVT in accordance with function J having as parameters the target gear ratio of the CVT calculated in S210 and the present gear ratio of the CVT 14 (S211). That is, the difference between the target gear ratio of the CVT and the present gear ratio of the CVT 14 is used to determine the gear change speed to reach the target gear ratio of the CVT. Moreover, the ECU 56 calculates the target torque which is necessary to obtain the speed required by the driver in accordance with function K having as parameters the degree of opening of the accelerator and the number of revolutions of the engine 12 (S212).

The preventive ECU 60 determines whether or not the present period is the backlash preventive control period (S213). A counter is set to a predetermined period of time when, for example, the idle switch has been changed from ON to OFF. If the counter is being operated, it is determined that the present period is the backlash preventive control period. If a determination is made in S213 that the present period is the backlash preventive control period, the ECU 56 controls the engine 12 with the target torque calculated in S212 as shown in the middle column of FIG. 19. Moreover, the ECU 58 employs the required gear changing speed for preventing backlash to change the gear ratio of the CVT 14 toward the speed decrease side by a predetermined quantity (for example, 20% to 30%) as the value of the required gear change speed of the CVT (S214). This target gear change speed for preventing backlash is determined in accordance with the function of the target torque and arranged to have an inclination which is changed in accordance with the target torque.

If a determination is made that the present period is not the backlash preventive control period in S213, that is, a determination is made that the prevention of the backlash has been completed, the usually-required gear change speed of the CVT for realizing a change to the gear ratio of the CVT 14 which is required to obtain the speed required by the driver is employed as the value of the required gear change speed of the CVT (S215). Thus, the control of the engine 12 and the CVT 14 is continued in a state in which the engine 12 is operated as the driving side. Note that the control in accordance with the foregoing flow chart is repeatedly performed at predetermined intervals (for example, 16 ms).

As described above, the gear ratio of the CVT 14 is slightly changed toward the speed decrease side during the backlash preventive control period. Therefore, the rotational speed of the rotational portion of the wheel (the vehicle) is, in the same direction, raised slightly slower than the rise in the rotation of the engine as indicated in the lower column of FIG. 19. That is, the rotational portion of the vehicle is gradually moved in the direction in which the backlash is canceled while the foregoing rotational portion is being moved in the same direction as the engine side. As a result, the backlash can be smoothly canceled. Therefore, discomfort for a person in the vehicle caused from shock or backing or transient surge can be prevented. Moreover, driving of the vehicle can be smoothly performed. Since the backlash is canceled in a state in which the rotational portions of the engine 12 and the vehicle sides are moved in the same direction, the response of acceleration after the operation for canceling the backlash has been completed can be improved.

Figure 20:
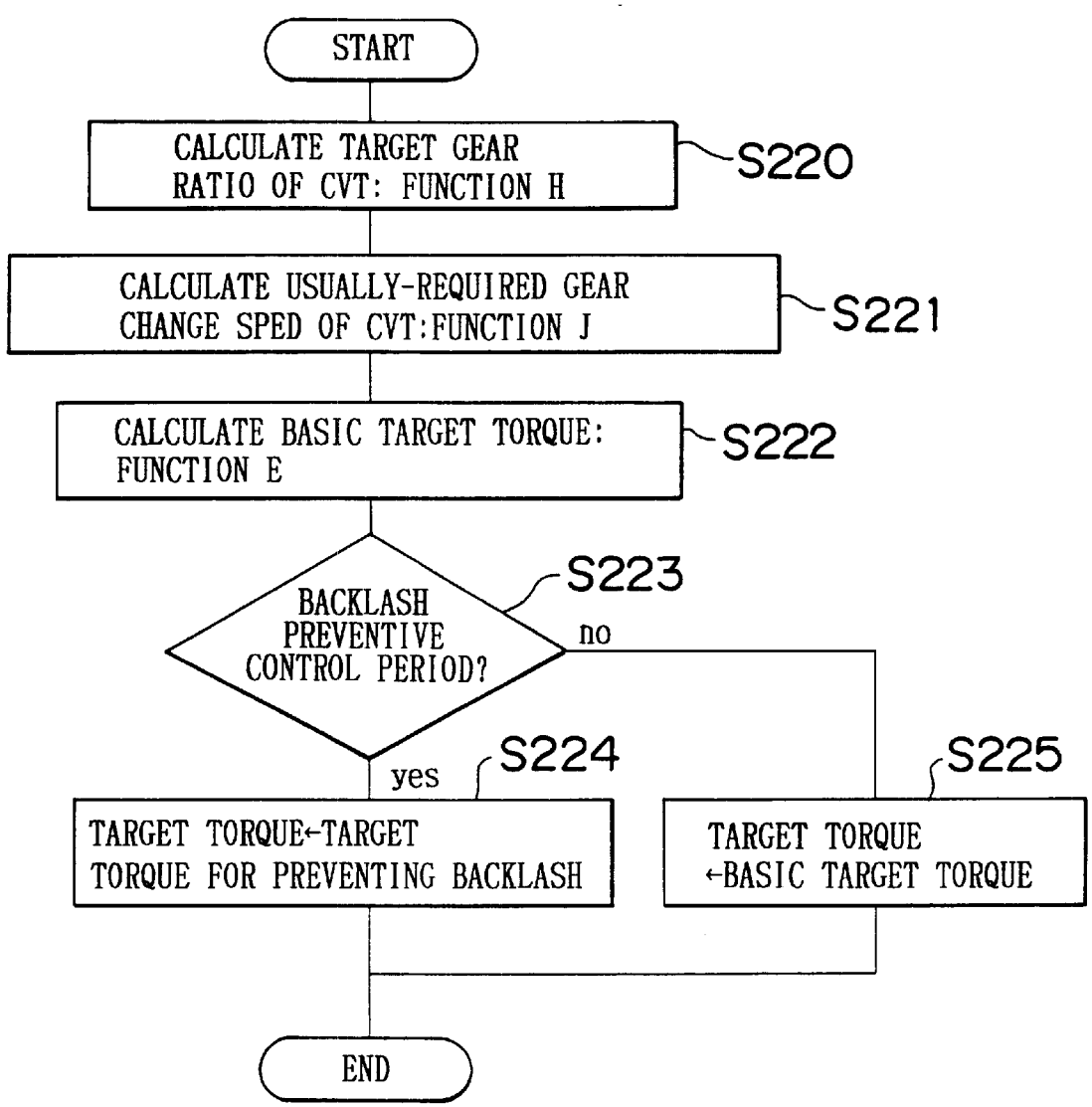
FIG. 20 is a flow chart showing the eighth embodiment of the present invention to describe backlash prevention which is performed by increasing/decreasing the engine torque.

FIG. 20 is a flow chart for controlling the drive state of the engine 12 when the acceleration is started, that is, when the engine 12 is changed from the driven state to the driving state. Specifically, the torque of the engine 12 is adjusted to cancel the backlash. The ECU 58 shown in FIG. 1 calculates a target gear ratio of the CVT which is necessary to obtain the speed required by the driver in accordance with function H having as parameters the present degree of opening of the accelerator and vehicle speed (S220). Then, the ECU 58 calculates the usually-required gear change speed of the CVT for realizing a change to the target gear ratio of the CVT 14 in accordance with function J having as parameters the target gear ratio of the CVT calculated in S220 and the present gear ratio of the CVT 14 (S221). That is, the difference between the target gear ratio of the CVT and the present gear ratio of the CVT 14 is used to determine the gear change speed to reach the target gear ratio of the CVT. A target torque which is necessary to obtain the speed required by the driver is calculated in accordance with function E having as parameters the degree of opening of the accelerator and the number of revolutions of the engine 12 (S222).

The preventive ECU 60 determines whether or not the present period is the backlash preventive control period (S223). When, for example, the idle switch has been changed from ON to OFF, the counter is set to a predetermined time. If the foregoing counter is being operated, a determination is made that the present period is the backlash preventive control period. If a determination is made in S223 that the present period is the backlash preventive control period, the ECU 58 controls the gear change of the CVT 14 with the usually-required gear change speed of the CVT calculated in S221 as shown in the upper column of FIG. 21. Moreover, as shown in the middle column of FIG. 21, the ECU 56 employs, as the value of the target torque, the target torque for preventing the backlash which is smaller than the basic target torque determined in accordance with the function of the usually-required gear change speed of the CVT (S224).

If a determination is performed in S223 that the present period is not the backlash preventive control period, that is, if a determination is made that the prevention of the backlash has been completed, the basic target torque for realizing change to the torque of the engine 12 which is necessary to obtain the speed required by the driver is employed as the value of target torque (S225). In a state in which the engine 12 serves as the drive side, control of the engine 12 and the CVT 14 is continued. Note that the control in accordance with the foregoing flow chart is repeatedly performed at predetermined intervals (for example, 16 ms).

Figure 21:
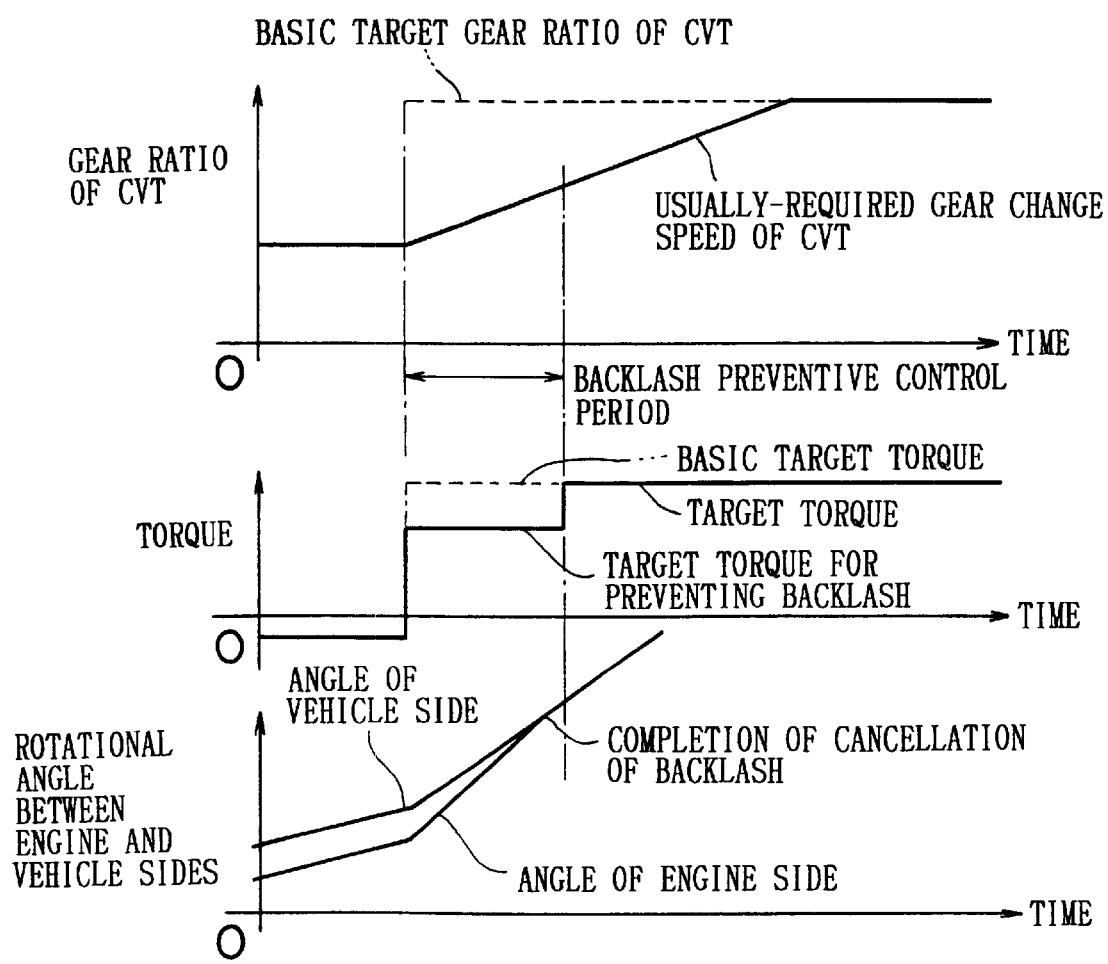
FIG. 21 is a graph showing the eighth embodiment of the present invention to describe transition of the gear ratio of the CVT, that of the engine torque and that of the rotational angles of the engine side and the vehicle side when the engine torque has been changed.

As described above, the torque of the engine 12 is slightly increased during the backlash preventive control period in which the gear change is being performed at the usually-required gear change speed of the CVT as indicated in the middle column of FIG. 21. Therefore, the rotational speed of the engine is, in the same direction, raised slightly faster than the rise in the rotational of the wheels (the vehicle) due to the gear change, as shown in the lower column of FIG. 21. That is, the engine side is gradually separated to move in the direction in which the backlash is canceled while the engine side is being moved in the same direction as the rotational portion of the wheels (the vehicle). As a result, backlash is canceled smoothly, without causing discomfort for a person in the vehicle due to shock or backing or transient surge. Moreover, driving of the vehicle can smoothly be performed. Since the rotational portions of the engine 12 and the vehicle sides cancel the backlash while the foregoing rotational portions are being moved in the same direction, acceleration response after the operation for canceling the backlash has been performed can be improved. When controls shown in FIGS. 18 to 21 are combined, the backlash can be canceled more quickly and smoothly.

In each of the foregoing embodiments, the structure and the procedure of the control may be varied to obtain a similar effect obtained through another of the above-mentioned embodiments if the backlash present in the drive system is canceled by controlling the engine torque and the gear ratio of the CVT by the method disclosed in each embodiment. In each embodiment, the description has been made mainly on the acceleration in which the engine 12 side is changed from the driven state to the driving state. A similar control may be applied to a deceleration state in which the engine 12 side is changed from the driving state to the driven state.

According to the present invention, in a vehicle of the type having backlash in the drive system thereof, when the relationship between the power source and the wheels connected to the continuously variable transmission is alternately switched between the driven state and the driving state, the backlash is quickly and adequately canceled and vibrations of the vehicle in the longitudinal direction are sufficiently prevented so as to prevent discomfort for a person in the vehicle.

What is claimed is:

1. A control apparatus for a vehicle, comprising:

a power source;

a continuously variable transmission which is capable of continuously varying a gear ratio thereof;

a drive system connected in series with the continuously variable transmission in the torque transfer direction; and a backlash preventive control unit constructed to control at least one of a driven state of the power source and the gear ratio of the continuously variable transmission so as to cancel a backlash present in the drive system resulting from a gap between elements of the drive system, whenever the gap is present, to prevent vibrations of the vehicle caused by the backlash when a driving state wherein power is transmitted from the power source to the continuously variable transmission, and a driven state wherein power is transmitted from wheels connected to the power source and the continuously variable transmission through the drive system, are alternately changed.

2. A control apparatus for a vehicle according to claim 1, wherein the backlash preventive control unit is constructed to determine one of an output of the power source during the preventive control, and the output of the power source and a control period in which the output of the power source is controlled in accordance with a factor which exerts an influence on the friction of the power source so as to cancel backlash.

3. A control apparatus for a vehicle according to claim 1, wherein the backlash preventive control unit is constructed to determine one of an output of the power source during the preventive control, and the output of the power source and a control period in which the output of the power source is controlled in accordance with the gear ratio of the continuously variable transmission and a vehicle speed so as to cancel backlash.

4. A control apparatus for a vehicle, comprising:

a power source;

a continuously variable transmission which is capable of continuously varying a gear ratio thereof; and a backlash preventive control unit constructed to cancel backlash present in a drive system to prevent vibrations of the vehicle caused by the backlash when a driving state wherein power is transmitted from the power source to the continuously variable transmission, and a driven state wherein power is transmitted from wheels connected to the power source and the continuously variable transmission through the drive system, are alternately changed;

and wherein the backlash preventive control unit is constructed to perform short-period control for completing prevention of backlash in a short time when the power source and the continuously variable transmission are changed from the driven state to the driving state, and the backlash preventive control unit is constructed to perform long-period control for completing prevention of backlash in a time longer than the short-period control when the power source and the continuously variable transmission are changed from the driving state to the driven state.

5. A control apparatus for a vehicle according to claim 4 wherein
the backlash preventive control unit is constructed to determine a switch between the driven state and the driving state in response to a signal supplied from an idle switch to cancel backlash.

6. A control apparatus for a vehicle according to claim 4, wherein
the backlash preventive control unit is constructed to determine a switch between the driven state and the driving state in accordance with the magnitude of predicted friction torque of the power source and the magnitude of indicator torque of the power source to cancel backlash.

7. A control apparatus for a vehicle according to claim 1, wherein
the backlash preventive control unit is constructed to recognize completion of a control period for preventive control in accordance with a change in the vehicle speed to complete an operation for canceling backlash.

8. A control apparatus for a vehicle according to claim 1, wherein
the backlash preventive control unit is constructed to change the gear ratio of the continuously variable transmission toward an speed increase side to cancel backlash in the drive system before the output of the power source is increased when the power source and the continuously variable transmission are changed from the driven state to the driving state, and the backlash preventive control unit is constructed to then increase the output of the power source and change the gear ratio of the continuously variable transmission toward a speed decrease side.

9. A control apparatus for a vehicle according to claim 1, wherein
the backlash preventive control unit is constructed to control at least one of the output of the power source and the gear ratio of the continuously variable transmission so as to causes rise in the number of revolutions of the power source to be relatively higher than rise in the number of revolutions of the wheels to cancel backlash when the power source and the continuously variable transmission are changed from the driven state to the driving state.

10. A control apparatus for a vehicle, comprising:
a power source;
a continuously variable transmission which is capable of continuously varying a gear ratio thereof; and
a backlash preventive control unit constructed to control at least one of a driven state of the power source and the gear ratio of the continuously variable transmission so as to cancel a backlash present in a drive system resulting from a gap between elements of the drive system, whenever the gap is present, to prevent vibrations of the vehicle caused by the backlash when a driving state wherein power is transmitted from the power source to the continuously variable transmission, and a driven state wherein power is transmitted from wheels connected to the power source and the continuously variable transmission through the drive system, are alternately changed,
wherein the output of the power source is controlled in accordance with the gear ratio of the continuously variable transmission and a vehicle speed so as to cancel backlash.

* * * * *